United States Patent
Hosono et al.

(10) Patent No.: US 12,534,127 B2
(45) Date of Patent: Jan. 27, 2026

(54) STEERING CONTROL DEVICE

(71) Applicants: JTEKT CORPORATION, Kariya (JP); TOYOTA JIDOSHA KABUSHIKI KAISHA, Toyota (JP)

(72) Inventors: Hiroshi Hosono, Toyota (JP); Terutaka Tamaizumi, Okazaki (JP); Yuki Inden, Okazaki (JP); Saki Takahashi, Seto (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 104 days.

(21) Appl. No.: 18/673,847

(22) Filed: May 24, 2024

(65) Prior Publication Data
US 2024/0400134 A1 Dec. 5, 2024

(30) Foreign Application Priority Data
May 31, 2023 (JP) .................. 2023-089704

(51) Int. Cl.
*B62D 6/00* (2006.01)
*B62D 5/04* (2006.01)

(52) U.S. Cl.
CPC .......... *B62D 6/008* (2013.01); *B62D 5/0463* (2013.01); *B62D 5/0466* (2013.01); *B62D 6/00* (2013.01)

(58) Field of Classification Search
CPC .... B62D 6/008; B62D 5/0466; B62D 5/0463; B62D 6/00
See application file for complete search history.

(56) References Cited

U.S. PATENT DOCUMENTS

| | | | |
|---|---|---|---|
| 6,239,568 B1 * | 5/2001 | Sugitani | B62D 6/00 701/72 |
| 7,321,216 B2 * | 1/2008 | Suzuki | B62D 5/0487 388/906 |

(Continued)

FOREIGN PATENT DOCUMENTS

| | | |
|---|---|---|
| DE | 100 32 183 A1 | 1/2002 |
| JP | 2017-144887 A | 8/2017 |

OTHER PUBLICATIONS

Oct. 23, 2024 Extended Search Report issued European Patent Application No. 24178472.7.

*Primary Examiner* — Phutthiwat Wongwian
*Assistant Examiner* — Brian R Kirby
(74) *Attorney, Agent, or Firm* — Oliff PLC

(57) ABSTRACT

A steering control device includes a processor that controls, as a target, a steering system including a reaction force motor that applies a steering reaction force to a steering shaft and a turning motor that turns a turning wheel in a state where power transmission from the steering shaft is cut off. The processor executes a reaction force setting process, a reaction force application process, and an interlocking process. The reaction force setting process is a process of setting the steering reaction force, and the reaction force application process is a process of operating the reaction force motor. A reaction force adjustment process is a process of adjusting the steering reaction force, and a phase compensation process is a process of performing phase compensation of the steering reaction force separately from the reaction force adjustment process.

12 Claims, 15 Drawing Sheets

(56) References Cited

U.S. PATENT DOCUMENTS

| | | | |
|---|---|---|---|
| 7,341,125 B2* | 3/2008 | Yamamoto | B62D 5/0484 |
| | | | 180/444 |
| 9,376,140 B2 | 6/2016 | Chai et al. | |
| 11,059,516 B2 | 7/2021 | Kodera | |
| 2005/0039971 A1* | 2/2005 | Fujioka | B62D 6/008 |
| | | | 180/402 |
| 2009/0099731 A1* | 4/2009 | Watanabe | B62D 5/0463 |
| | | | 701/41 |
| 2009/0112405 A1* | 4/2009 | Tamaizumi | B62D 5/0466 |
| | | | 701/41 |
| 2012/0271516 A1* | 10/2012 | Takahashi | B62D 5/0466 |
| | | | 701/42 |
| 2015/0353126 A1* | 12/2015 | Chai | B62D 6/008 |
| | | | 701/42 |
| 2018/0339725 A1* | 11/2018 | Kodera | B62D 5/046 |
| 2019/0225261 A1* | 7/2019 | Kodera | B62D 5/0463 |
| 2019/0233004 A1* | 8/2019 | Kodera | B62D 3/12 |
| 2019/0359250 A1* | 11/2019 | Isshiki | B62D 6/10 |
| 2020/0177113 A1* | 6/2020 | Suzuki | B62D 5/046 |
| 2020/0377149 A1* | 12/2020 | Tagami | B60G 17/0162 |
| 2022/0315097 A1* | 10/2022 | Yoshida | B62D 6/008 |
| 2023/0303158 A1* | 9/2023 | Koo | B62D 5/006 |

* cited by examiner

STEERING CONTROL DEVICE

CROSS-REFERENCE TO RELATED APPLICATION

This application claims priority to Japanese Patent Application No. 2023-089704 filed on May 31, 2023, incorporated herein by reference in its entirety.

BACKGROUND

1. Technical Field

The present disclosure relates to a steering control device.

2. Description of Related Art

For example, Japanese Unexamined Patent Application Publication No. 2017-144887 (JP 2017-144887 A) describes a control device that controls an electric power-assisted steering device as a target. Using a phase compensation process, this control device sets a torque of a motor that generates an assistive force. This setting aims at system stabilization etc.

SUMMARY

The present inventors studied control of a steering system in a state where power transmission between a steering shaft and turning wheels is cut off. In this case, there is a high degree of freedom in adjusting the characteristics of the steering system through control. However, in the case where the characteristics of the steering system are arbitrarily set, the stabilizing effect of the phase compensation process may be impaired.

Means for solving this problem and the workings and advantages thereof will be described below.

An aspect of the present disclosure is a steering control device. The steering control device includes a processor that configured to control, as a target, a steering system including a reaction force motor that applies a steering reaction force to a steering shaft and a turning motor that turns a turning wheel in a state where power transmission from the steering shaft is cut off. The processor is configured to execute a reaction force setting process, a reaction force application process, and an interlocking process. The reaction force setting process is a process of setting the steering reaction force using a phase compensation process and a reaction force adjustment process. The reaction force application process is a process of operating the reaction force motor using, as an input, the steering reaction force set by the reaction force setting process. The reaction force adjustment process is a process of adjusting the steering reaction force. The phase compensation process is a process of performing phase compensation of the steering reaction force separately from the reaction force adjustment process. The interlocking process is a process of, according to one of a phase compensation specifying variable and a reaction force adjustment variable, changing the other one of the two. The phase compensation specifying variable is a variable for specifying a manner of the phase compensation. The reaction force adjustment variable is either a variable for specifying the reaction force adjustment process or a variable relating to an output of the reaction force adjustment process.

The phase compensation process performs phase compensation of the steering reaction force. Appropriate phase compensation varies according to settings of the reaction force adjustment process that specifies the steering reaction force. In the above-described configuration, therefore, according to one of the phase compensation specifying variable and the reaction force adjustment variable, the other one of the two is changed. This can make the phase compensation process a process that can exhibit a stabilizing effect relative to the settings of the reaction force adjustment process.

In the above-described steering control device, the reaction force setting process may include an assistance amount setting process and an axial force setting process. The axial force setting process may be a process of setting an axial force that is a force acting against a driver's operation of rotating the steering shaft. The assistance amount setting process may be a process of setting an assistance amount using the phase compensation process and the reaction force adjustment process. The assistance amount may be an amount of assisting the driver in rotating the steering shaft. The steering reaction force may be an amount that is determined according to a value obtained by subtracting the assistance amount from the axial force.

In the steering system in which power is transmitted between the steering shaft and the turning wheels, the axial force from the turning wheels is a force that hinders the driver's operation of rotating the steering shaft. Therefore, the assistance amount is an amount of assisting the driver's steering. On the other hand, in the above-described configuration, an axial force acting against the operation of rotating the steering shaft can be virtually realized by control in the state where power transmission between the steering shaft and the turning wheels is cut off. Thus, the assistance amount can be set based on the same concept as in the steering system in which power is transmitted between the steering shaft and the turning wheels.

In the above-described steering control device, the reaction force adjustment process may include a predetermined component reflection process. The reaction force adjustment variable may include either a reflection specifying variable or a variable relating to an output of the predetermined component reflection process. The predetermined component reflection process may be a process of reflecting, on the steering reaction force, a predetermined component of a frequency signal applied to the turning wheel, and include a predetermined component extraction process and an extraction changing process. The predetermined component extraction process may be a process of extracting the predetermined component according to a value of the reflection specifying variable. The reflection specifying variable may be a variable that specifies a manner of extraction of the predetermined component. The extraction changing process may be a process of changing the value of the reflection specifying variable. The interlocking process may include a process of changing a value of the phase compensation specifying variable according to either the value of the reflection specifying variable or a value of the variable relating to the output of the predetermined component reflection process.

The predetermined component is a frequency component having information on a road surface. Thus, according to the above-described configuration, since the steering reaction force is set using the predetermined component reflection process, the road surface information can be communicated to the driver.

However, the steering system tends to become unstable depending on the frequency band of the predetermined component or the magnitude of the amplitude of the predetermined component. In the above-described configuration, therefore, the manner of the phase compensation is changed according to the manner of the reflection of the predetermined component or to the predetermined component. Thus, appropriate phase compensation for stabilizing the steering system can be realized.

In the above-described steering control device, the reaction force adjustment process may include a predetermined component reflection process. The reaction force adjustment variable may include a reflection specifying variable. The predetermined component reflection process may be a process of reflecting, on the steering reaction force, a predetermined component of a frequency signal applied to the turning wheel, and include a predetermined component extraction process and an extraction changing process. The predetermined component extraction process may be a process of extracting the predetermined component according to a value of the reflection specifying variable. The reflection specifying variable may be a variable that specifies a manner of extraction of the predetermined component. The extraction changing process may be a process of changing the value of the reflection specifying variable. The phase compensation process may include a compensation changing process. The compensation changing process may be a process of changing a value of the phase compensation specifying variable. The interlocking process may include a process of changing the value of the reflection specifying variable according to the value of the phase compensation specifying variable.

The predetermined component is a frequency component having information on a road surface. Thus, according to the above-described configuration, since the steering reaction force is set using the predetermined component reflection process, the road surface information can be communicated to the driver.

However, the steering system tends to become unstable depending on the frequency band of the predetermined component or the magnitude of the amplitude of the predetermined component. In the above-described configuration, therefore, the manner of the reflection of the predetermined component is changed according to the manner of the phase compensation. Thus, the predetermined component can be reflected on the steering reaction force within an allowable range by the phase compensation process.

In the above-described steering control device, the reaction force adjustment process may include a hysteresis process. The reaction force adjustment variable may include either a hysteresis specifying variable or a variable relating to an output of the hysteresis process. The hysteresis process may be a process of reflecting a hysteresis correction amount on the steering reaction force, and include a hysteresis correction amount calculation process and a hysteresis changing process. The hysteresis correction amount calculation process may be a process of calculating the hysteresis correction amount according to the hysteresis specifying variable so as to have different values for when steering further and when steering back. The hysteresis changing process may be a process of changing a value of the hysteresis specifying variable. The interlocking process may include a process of changing a value of the phase compensation specifying variable according to either the value of the hysteresis specifying variable or a value of the variable relating to the output of the hysteresis process.

When the setting of the hysteresis correction amount is changed, a ratio of a change in the steering reaction force to a change in the steering torque is changed. This is equivalent to changing a gain of the steering reaction force. When the gain of the steering reaction force is changed, the manner of appropriate phase compensation for keeping the steering system stable changes.

In the above-described configuration, therefore, the manner of the phase compensation is changed according to the value of the hysteresis specifying variable or the hysteresis correction amount. Thus, appropriate phase compensation can be realized according to the manner of setting the hysteresis correction amount or to the hysteresis correction amount.

In the above-described steering control device, the reaction force adjustment process may include a hysteresis process. The reaction force adjustment variable may include a hysteresis specifying variable. The hysteresis process may be a process of reflecting a hysteresis correction amount on the steering reaction force, and include a hysteresis correction amount calculation process and a hysteresis changing process. The hysteresis correction amount calculation process may be a process of calculating the hysteresis correction amount according to a value of the hysteresis specifying variable so as to have different values for when steering further and when steering back. The hysteresis changing process may be a process of changing the value of the hysteresis specifying variable. The phase compensation process may include a compensation changing process. The compensation changing process may be a process of changing a value of the phase compensation specifying variable. The interlocking process may include a process of changing the value of the hysteresis specifying variable according to the value of the phase compensation specifying variable.

The hysteresis process affects the ratio of the change in the steering reaction force to the change in the steering torque. This means that the hysteresis process affects the magnitude of the gain of the steering reaction force. On the other hand, the magnitude of the gain of the steering reaction force that is allowable in keeping the steering system stable varies depending on the manner of the phase compensation process.

In the above-described configuration, therefore, the value of the hysteresis specifying variable is changed according to the value of the phase compensation specifying variable. Thus, the hysteresis process can be restricted such that the gain of the steering reaction force becomes a gain that is allowable in keeping the steering system stable by the phase compensation.

In the above-described steering control device, the reaction force adjustment process may include a damping process. The reaction force adjustment variable may include either a damping specifying variable or a variable relating to an output of the damping process. The damping process may be a process of reflecting a damping correction amount on the steering reaction force, and include a damping correction amount calculation process and a damping changing process. The damping correction amount calculation process may be a process of calculating the damping correction amount according to a value of the damping specifying variable. The damping correction amount may be an amount having a negative correlation with a rotation speed of the steering shaft. The damping changing process may be a process of changing the value of the damping specifying variable. The interlocking process may include a process of changing a value of the phase compensation specifying variable according to either the value of the damping specifying variable or a value of the variable relating to the output of the damping process.

The responsiveness of the steering system varies according to the setting of the damping correction amount or to the damping correction amount. Thus, an appropriate manner of the phase compensation for keeping the steering system stable varies according to the setting of the damping correction amount or to the damping correction amount. In the above-described configuration, therefore, the manner of the phase compensation is changed according to the value of the damping specifying variable or the damping correction amount. Thus, appropriate phase compensation can be realized according to the manner of setting the damping correction amount or to the damping correction amount.

In the above-described steering control device, the reaction force adjustment process may include a damping process. The reaction force adjustment variable may include a damping specifying variable. The damping process may be a process of reflecting a damping correction amount on the steering reaction force, and include a damping correction amount calculation process and a damping changing process. The damping correction amount calculation process may be a process of calculating the damping correction amount according to a value of the damping specifying variable. The damping correction amount may be an amount having a negative correlation with a rotation speed of the steering shaft. The phase compensation process may include a compensation changing process. The compensation changing process may be a process of changing a value of the phase compensation specifying variable. The interlocking process may include a process of changing the value of the damping specifying variable according to the value of the phase compensation specifying variable.

The responsiveness of the steering system varies according to the setting of the damping correction amount. On the other hand, the responsiveness of the steering system that is allowable in keeping the steering system stable varies according to the phase compensation. In the above-described configuration, therefore, the manner of setting the damping correction amount is changed according to the value of the phase compensation specifying variable. Thus, an appropriate damping process can be realized according to the manner of the phase compensation.

In the above-described steering control device, the reaction force adjustment process may include a steering return process. The reaction force adjustment variable may include either a return specifying variable or a variable relating to an output of the steering return process. The steering return process may be a process of reflecting a return correction amount on the steering reaction force according to a value of the return specifying variable, and include a return correction amount calculation process and a return changing process. The return correction amount calculation process may be a process of calculating the return correction amount. The return correction amount may be a correction amount for shifting the steering shaft to a neutral position. The return changing process may be a process of changing the value of the return specifying variable. The interlocking process may include a process of changing a value of the phase compensation specifying variable according to either the value of the return specifying variable or the variable relating to the output of the steering return process.

The steering return process affects the ratio of the change in the steering reaction force to the change in the steering torque. This means that the steering return process affects the magnitude of the gain of the steering reaction force. When the gain of the steering reaction force is changed, an appropriate manner of the phase compensation for keeping the steering system stable changes.

In the above-described configuration, therefore, the manner of the phase compensation is changed according to the value of the return specifying variable or the return correction amount. Thus, appropriate phase compensation can be realized according to the steering return process.

In the above-described steering control device, the reaction force adjustment process may include a steering return process. The reaction force adjustment variable may include a return specifying variable. The steering return process may be a process of reflecting a return correction amount on the steering reaction force according to a value of the return specifying variable, and include a return correction amount calculation process and a return changing process. The return correction amount calculation process may be a process of calculating the return correction amount. The return correction amount may be a correction amount for shifting the steering shaft to a neutral position. The phase compensation process may include a compensation changing process. The compensation changing process may be a process of changing a value of the phase compensation specifying variable. The interlocking process may include a process of changing the value of the return specifying variable according to the value of the phase compensation specifying variable.

The steering return process affects the ratio of the change in the steering reaction force to the change in the steering torque. This means that the steering return process affects the magnitude of the gain of the steering reaction force. On the other hand, the magnitude of the gain of the steering reaction force that is allowable in keeping the steering system stable varies according to the manner of the phase compensation process.

In the above-described configuration, therefore, the value of the return specifying variable is changed according to the value of the phase compensation specifying variable. Thus, the steering return process can be restricted such that the gain of the steering reaction force becomes a gain that is allowable in keeping the steering system stable by the phase compensation.

In the above-described steering control device, the assistance amount setting process may include a basic assistance amount setting process. The basic assistance amount setting process may be a process of setting a basic assistance amount according to a detected value of a steering torque. The basic assistance amount may be an amount serving as a basis for setting the assistance amount. The phase compensation process may include a phase delay compensation process. The phase delay compensation process may be a process of delaying the detected value of the steering torque so as to be used as an input for the basic assistance amount setting process. The phase compensation specifying variable used as an input for the interlocking process may include a phase delay specifying variable. The phase delay specifying variable may be a variable that specifies a manner of the delaying.

In the above-described configuration, the phase of the steering torque that is used as the input for the basic assistance amount setting process can be adjusted.

In the above-described steering control device, the phase compensation process may include a phase advance compensation process. The phase advance compensation process may be a process of reflecting, on the steering reaction force, an advance compensation amount for advancing a phase of the steering reaction force using a steering torque as an input. The phase compensation specifying variable that is used as an input for the interlocking process may include a phase advance specifying variable. The phase advance specifying variable may be a variable that specifies a manner of advancing the phase.

In the above-described configuration, the phase of the change in the steering reaction force relative to the change in the steering torque can be adjusted.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
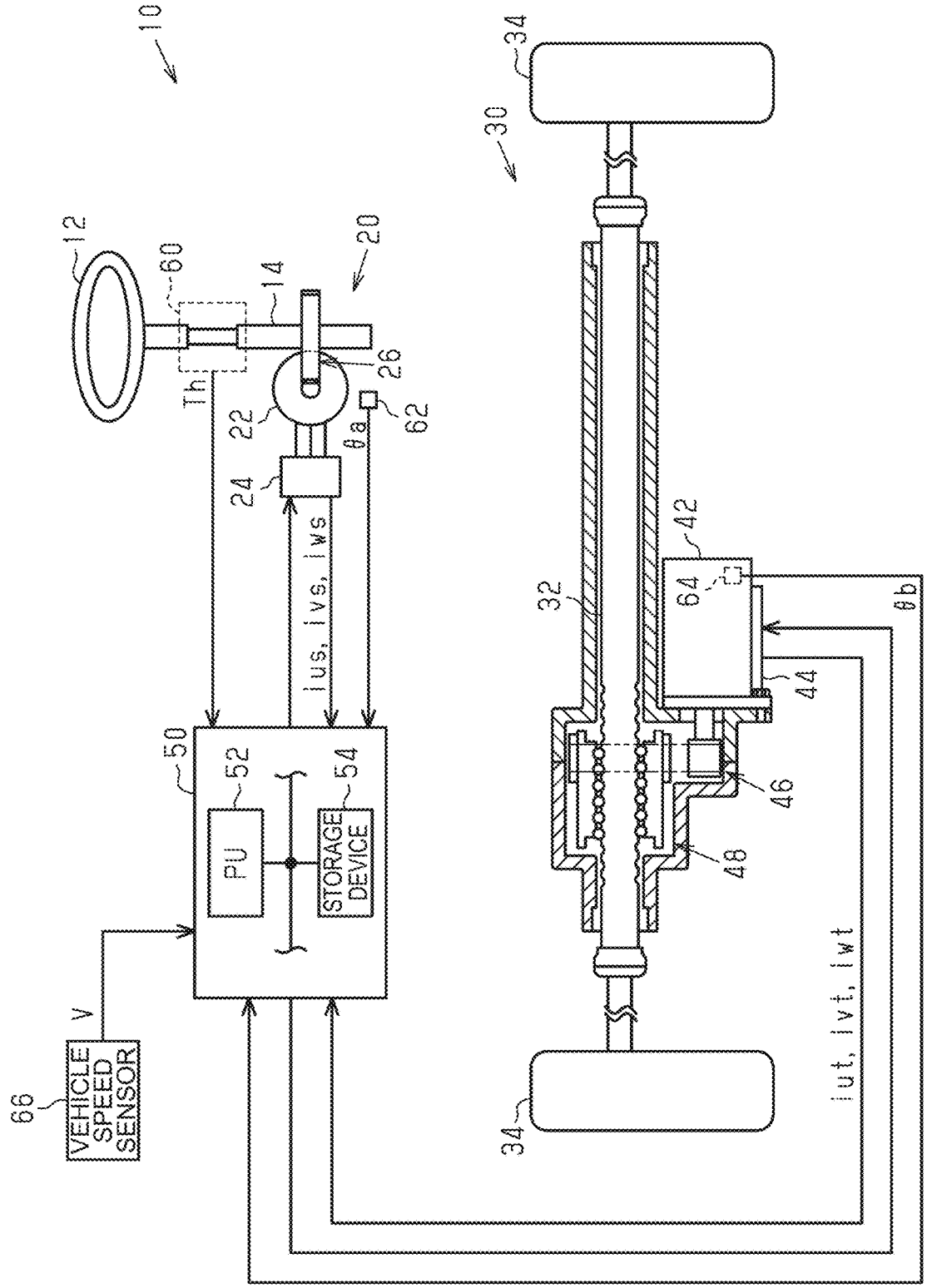
FIG. 1 is a diagram showing the configuration of a steering system according to a first embodiment.

One embodiment of a steering control device will be described in accordance with the drawings.
Prerequisite Configuration A steering device 10 of a vehicle shown in FIG. 1 is a steer-by-wire device. The steering device 10 includes a steering wheel 12, a steering shaft 14, a reaction force actuator 20, and a turning actuator 30. The steering shaft 14 is coupled to the steering wheel 12. The reaction force actuator 20 is an actuator that applies a force acting against a force with which a driver operates the steering wheel 12. The reaction force actuator 20 has a reaction force motor 22, a reaction force inverter 24, and a reaction force speed reduction mechanism 26. The reaction force motor 22 applies a steering reaction force that is a force acting against steering to the steering wheel 12 through the steering shaft 14. The reaction force motor 22 is coupled to the steering shaft 14 through the reaction force speed reduction mechanism 26. As one example, a three-phase synchronous motor is adopted as the reaction force motor 22. The reaction force speed reduction mechanism 26 is formed by, for example, a worm-and-wheel.

The turning actuator 30 is an actuator for the purpose of turning turning wheels 34 according to the driver's steering intension that is indicated by the driver's operation of the steering wheel 12. The turning actuator 30 includes a rack shaft 32, a turning motor 42, a turning inverter 44, a turning transmission mechanism 46, and a conversion mechanism 48. As one example, a three-phase surface magnet synchronous motor (SPM) is adopted as the turning motor 42. The turning transmission mechanism 46 is formed by a belt transmission mechanism. Rotary motive power of the turning motor 42 is transmitted to the conversion mechanism 48 by the turning transmission mechanism 46. The conversion mechanism 48 converts the transmitted rotary motive power into shifting motive power of the rack shaft 32 in an axial direction. As the rack shaft 32 shifts in the axial direction, the turning wheels 34 are turned.

The steering control device 50 controls the steering wheel 12 and the turning wheels 34 as targets. Specifically, the steering control device 50 controls the steering reaction force acting against the driver's steering that is a control amount of the steering wheel 12 as the control target. Further, the steering control device 50 controls a turning angle that is a control amount of the turning wheels 34 as the control targets. The turning angle is a steered angle of tires as the turning wheels 34.

To control the control amounts, the steering control device 50 refers to a steering torque Th detected by a torque sensor 60. The steering torque Th is a torque that the driver has applied to the steering shaft 14 through operation of the steering wheel 12. To control the control amounts, the steering control device 50 refers to a rotation angle θa that is an angle of a rotating shaft of the reaction force motor 22 detected by a steering-side rotation angle sensor 62. To control the control amounts, the steering control device 50 refers to currents ius, ivs, iws flowing through the reaction force motor 22. The currents ius, ivs, iws may be, for example, currents that are each detected as an amount of voltage drop of a shunt resistor provided in each leg of the reaction force inverter 24. To control the control amounts, the steering control device 50 refers to a rotation angle θb that is an angle of a rotating shaft of the turning motor 42 detected by a turning-side rotation angle sensor 64. To control the control amounts, the steering control device 50 refers to currents iut, ivt, iwt flowing through the turning motor 42. The currents iut, ivt, iwt may be, for example, currents that are each detected as an amount of voltage drop of a shunt resistor provided in each leg of the turning inverter 44. The steering control device 50 refers to a vehicle speed V detected by a vehicle speed sensor 66.

Figure 2:
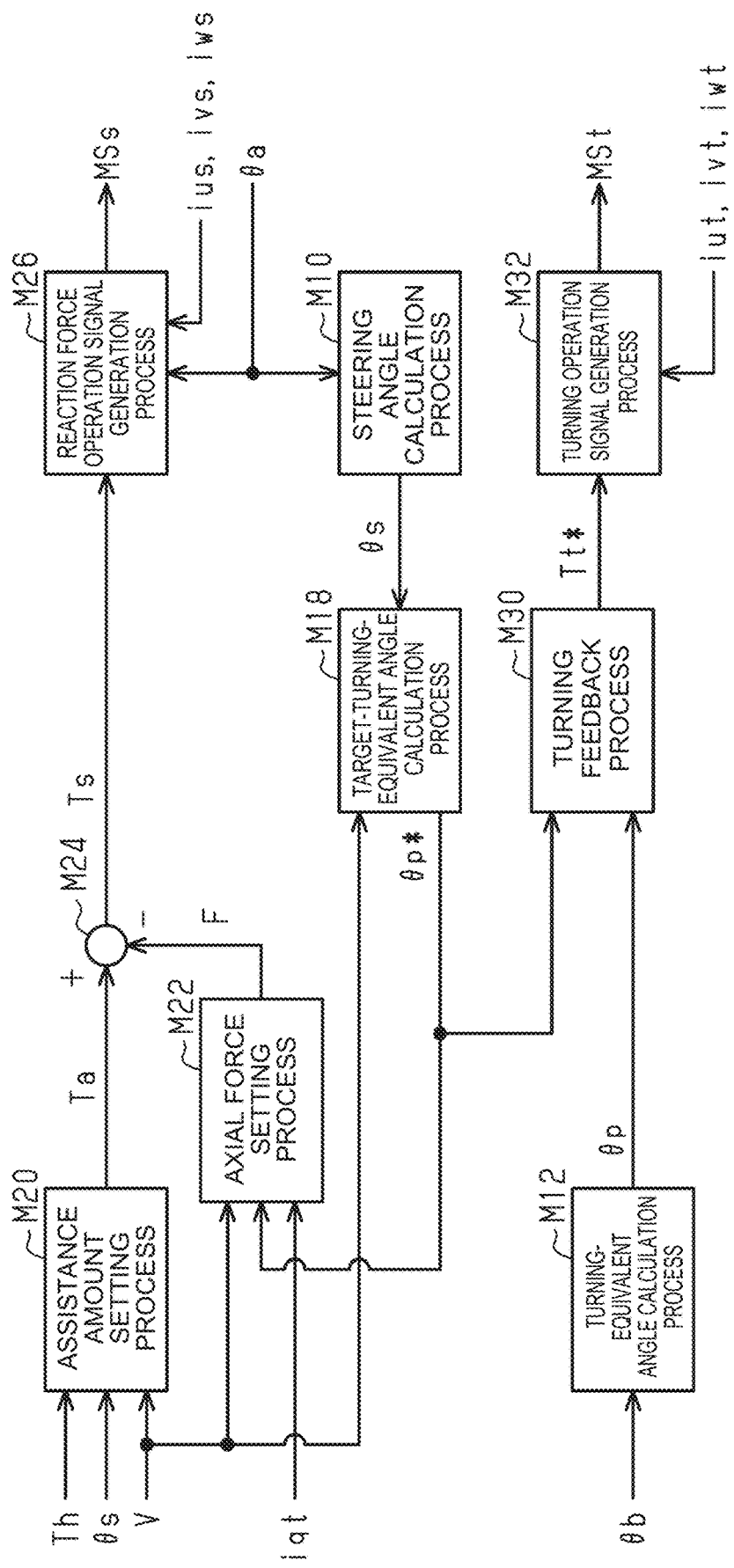
FIG. 2 is a block diagram showing processes that a control device according to the embodiment executes.

The steering control device 50 includes a PU 52 and a storage device 54. The PU 52 is a software processing device, such as a CPU, a GPU, or a TPU. The storage device 54 may be a non-volatile memory that is not electrically rewritable. The storage device 54 may be a non-volatile memory that is electrically rewritable and a storage medium, such as a disc medium.
Overview of Control FIG. 2 shows processes that the steering control device 50 executes. The processes shown in FIG. 2 are realized as the PU 52 repeatedly executes programs stored in the storage device 54, for example, on a predetermined cycle.

A steering angle calculation process M10 includes a process of converting the rotation angle θa into an integrated angle including a range exceeding 360 degrees by, for example, counting the number of revolutions of the reaction force motor 22 from a steering neutral position that is a position of the steering wheel 12 when the vehicle is moving straight forward. The steering angle calculation process M10 includes a process of calculating a steering angle θs by multiplying the integrated angle obtained by the conversion by a conversion factor based on a rotation speed ratio of the reaction force speed reduction mechanism 26.

A turning-equivalent angle calculation process M12 includes a process of converting the rotation angle θb into an integrated angle including a range exceeding 360 degrees by, for example, counting the number of revolutions of the turning motor 42 from a rack neutral position that is a position of the rack shaft 32 when the vehicle is moving straight forward. The turning-equivalent angle calculation process M12 includes a process of calculating a turning-equivalent angle θp according to the turning angle of the turning wheels 34 by multiplying the integrated angle obtained by the conversion by a conversion factor according to a speed reduction ratio of the turning transmission mechanism 46, a lead of the conversion mechanism 48, etc. The turning-equivalent angle θp is an amount that is in a proportional relationship with the turning angle. As one example, the turning-equivalent angle θp is positive when it is an angle on a right side of the rack neutral position and negative when it is an angle on a left side thereof.

A target-turning-equivalent angle calculation process M18 is a process of calculating a target-turning-equivalent angle θp* according to the steering angle θs and the vehicle speed V. An assistance amount setting process M20 is a process of calculating an assistance amount Ta using the steering torque Th, the steering angle θs, and the vehicle speed V as an input. The assistance amount Ta is an amount in the same direction as the driver's steering direction. The magnitude of the assistance amount Ta is set to a large value when a force for assisting the driver's steering is to be made large.

An axial force setting process M22 is a process of calculating an axial force F that acts on the rack shaft 32 through the turning wheels 34 using the vehicle speed V, a q-axis current iqt of the turning motor 42, and the target-turning-equivalent angle θp* as an input. The axial force F is a value that represents, by control, a force acting on the rack shaft 32 through the turning wheels 34. However, the axial force F need not be intended to estimate the force acting on the rack shaft 32 with high accuracy. The axial force F may be, for example, a force that virtually specifies the force acting on the rack shaft 32. The axial force F is converted into a torque applied to the steering shaft 14. That is, the axial force F is converted into a torque that is applied to the steering shaft 14 when a state is assumed where power transmission between the turning wheels 34 and the steering shaft 14 is possible. The axial force F is an amount that acts in the opposite direction from the driver's steering direction. The axial force setting process M22 may be a process of calculating the axial force F such that the absolute value of the axial force F becomes larger as the absolute value of the target-turning-equivalent angle θp* becomes larger. The axial force setting process M22 may be, for example, a process of calculating the axial force F such that the absolute value of the axial force F becomes larger as the vehicle speed V becomes higher. The axial force setting process M22 may be a process of calculating the axial force F such that the absolute value of the axial force F becomes larger as the absolute value of the q-axis current iqt becomes larger. Here, the q-axis current iqt is calculated by the PU 52 according to the turning-equivalent angle θp and the currents iut, ivt, iwt.

A reaction force calculation process M24 is a process of assigning a value obtained by subtracting the axial force F from the assistance amount Ta to a target reaction force torque Ts. The target reaction force torque Ts is a target value of the torque that the reaction force motor 22 applies to the steering shaft 14.

A reaction force operation signal generation process M26 is a process of generating an operation signal MSs for the reaction force inverter 24 so as to control the torque of the reaction force motor 22 such that the torque applied to the steering shaft 14 meets the target reaction force torque Ts. Specifically, the reaction force operation signal generation process M26 includes a process of converting the target reaction force torque Ts into a target torque of the reaction force motor 22. Further, the reaction force operation signal generation process M26 includes a process of calculating the operation signal MSs for the reaction force inverter 24 so as to bring the current flowing through the reaction force motor 22 close to a current that is determined from the target reaction force torque Ts by current feedback control. The operation signal MSs is, in reality, an operation signal for each of six switching elements of the reaction force inverter 24. As the torque of the reaction force motor 22 is set to the target reaction force torque Ts, the steering reaction force acting against the force that tries to rotate the steering wheel 12 becomes "(−1)·Ts."

A turning feedback process M30 is a process of assigning, to a target turning torque Tt*, an operation amount of feedback control in which the turning-equivalent angle θp is a control amount and the target-turning-equivalent angle θp* is a target value of the control amount. The target turning torque Tt* has a constant ratio to the torque of the turning motor 42.

A turning operation signal generation process M32 is a process of generating an operation signal MSt for the turning inverter 44 so as to control the torque of the turning motor 42 such that the torque of the turning motor 42 becomes a value having a constant ratio to the target turning torque Tt*. Specifically, the turning operation signal generation process M32 includes a process of converting the target turning torque Tt* into the target torque of the turning motor 42. Further, the turning operation signal generation process M32 includes a process of calculating the operation signal MSt for the turning inverter 44 so as to bring the current flowing through the turning motor 42 close to a current that is determined from the target torque by current feedback control. The operation signal MSt is, in reality, an operation signal for each of six switching elements of the turning inverter 44.

Axial Force Setting Process

Figure 3:
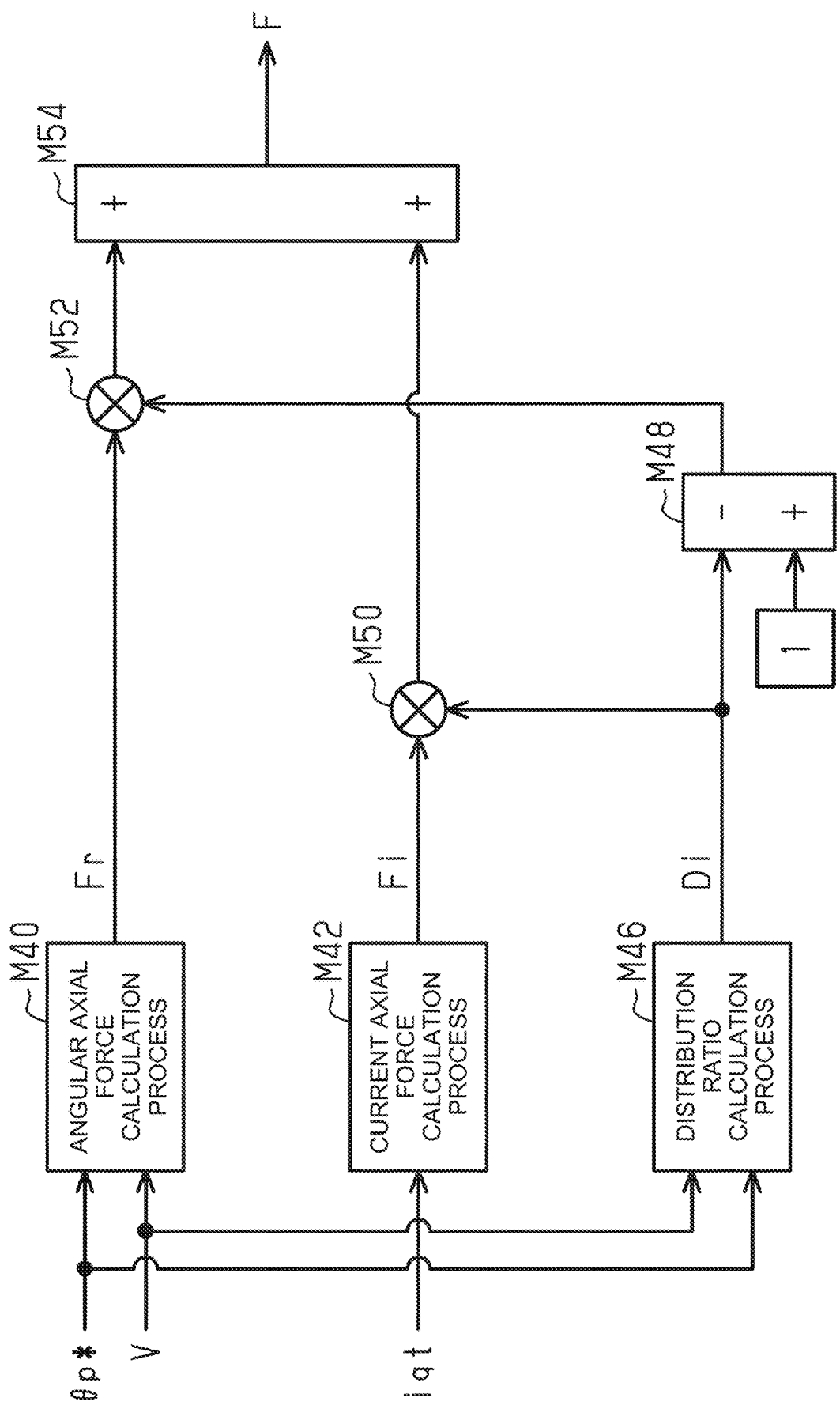
FIG. 3 is a block diagram showing processes that the control device according to the embodiment executes.

FIG. 3 shows details of the axial force setting process M22. An angular axial force calculation process M40 is a process of calculating an angular axial force Fr using the target-turning-equivalent angle θp* and the vehicle speed V as an input. The angular axial force Fr is an estimated value of an axial force that is specified by an arbitrarily set vehicle model etc. The angular axial force Fr is calculated as an axial force that does not reflect road surface information. The road surface information is information on minute depressions and protrusions that do not affect behavior of the vehicle in lateral directions, steps that affect the behavior of the vehicle in the lateral directions, etc. For example, the angular axial force calculation process M40 may calculate the angular axial force Fr such that the absolute value of the angular axial force Fr becomes larger as the absolute value of the target-turning-equivalent angle θp* becomes larger. Further, the angular axial force calculation process M40 may calculate the angular axial force Fr such that the absolute value of the angular axial force Fr becomes larger as the vehicle speed V becomes higher.

A current axial force calculation process M42 is a process of calculating a current axial force Fi using the q-axis current iqt of the turning motor 42 as an input. The current axial force Fi is an estimated value of an axial force that actually acts on the rack shaft 32 that operates to turn the turning wheels 34, i.e., an axial force that is actually transmitted to the rack shaft 32. The current axial force Fi is calculated as an axial force that reflects the aforementioned road surface information. For example, the current axial force calculation process M42 calculates the current axial force Fi based on an assumption that a torque applied to the rack shaft 32 by the turning motor 42 and a torque according to a force applied to the rack shaft 32 through the turning wheels 34 equilibrate with each other. That is, the current axial force calculation process M42 is a process of calculating the current axial force Fi such that the absolute value of the current axial force Fi becomes larger as the absolute value of the q-axis current iqt becomes larger.

A distribution ratio calculation process M46 is a process of calculating a ratio Di using the vehicle speed V and the target-turning-equivalent angle θp* as an input. The ratio Di is a ratio of the current axial force Fi to the sum of the angular axial force Fr and the current axial force Fi. The ratio Di has a value not smaller than zero and not larger than 1. The distribution ratio calculation process M46 may be, for example, a process of performing a map-based calculation of the ratio Di by the PU 52 in a state where map data is stored in the storage device 54. Here, the map data is data in which the vehicle speed V and the target-turning-equivalent angle θp* are input variables and the ratio Di is an output variable.

The map data refers to combinational data on discrete values of the input variable and values of the output variable corresponding to the respective values of the input variable. The map-based calculation may be a process in which, when the value of the input variable matches one of the values of the input variable in the map data, the corresponding value of the output variable in the map data is used as a calculation result. Or the map-based calculation may be a process in which, when the value of the input variable matches none of the values of the input variable in the map data, a value obtained by interpolation of the plurality of values of the output variables included in the map data is used as a calculation result. Or, instead of this, the map-based calculation may be a process in which, when the value of the input variable matches none of the values of the input variable in the map data, the value of the output variable in the map data that corresponds to the closest value among the plurality of values of the input variable included in the map data is used as a calculation result.

A second distribution ratio calculation process M48 is a process of calculating a second ratio "1−Di" by subtracting the ratio Di from "1." The second ratio is a ratio of the angular axial force Fr to the sum of the angular axial force Fr and the current axial force Fi.

A first ratio multiplication process M50 is a process of multiplying the current axial force Fi by the ratio Di. A second ratio multiplication process M52 is a process of multiplying the angular axial force Fr by the second ratio. An addition process M54 is a process of assigning, to the axial force F, a value obtained by adding up an output value of the first ratio multiplication process M50 and an output value of the second ratio multiplication process M52. Thus, the axial force F is a value resulting from weighted average processing of the angular axial force Fr and the current axial force Fi.

Assistance Amount Setting Process

Figure 4:
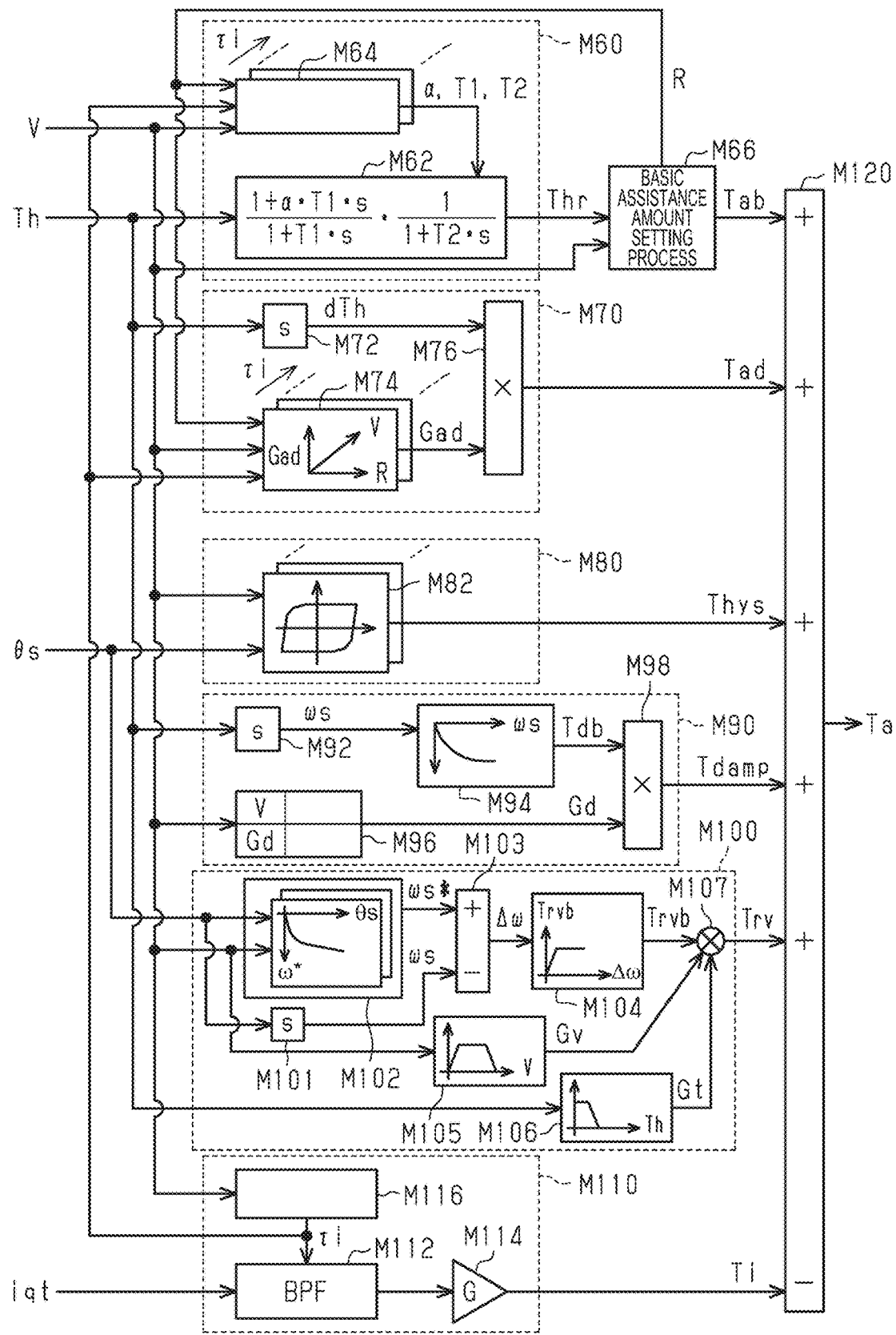
FIG. 4 is a block diagram showing processes that the control device according to the embodiment executes.

FIG. 4 shows details of the assistance amount setting process M20. A phase delay compensation process M60 is a process of delaying a phase of the steering torque Th. For example, this may be a process that aims at performing phase compensation on the steering torque Th so as to adjust a frequency characteristic of a phase difference between both sides of a torsion bar included in the torque sensor 60. The steering torque Th after the phase compensation that is an output value of the phase delay compensation process M60 is a steering torque Thr. The phase delay compensation process M60 includes a filter process M62 and a filter coefficient setting process M64.

The filter process M62 includes a phase delay filter and a low-pass filter. A transfer function of the phase delay filter is "$(1+\alpha \cdot T1 \cdot s)/(1+T1 \cdot s)$." A transfer function of the low-pass filter is "$1/(1+T2 \cdot s)$." A value obtained by processing the steering torque Th by the phase delay filter and the low-pass filter is the steering torque Thr.

The filter coefficient setting process M64 is a process of setting filter coefficients α, T1 of the phase delay filter and a filter coefficient T2 of the low-pass filter. The filter coefficient setting process M64 is a process of setting the filter coefficients α, T1, T2 according to an assistance gradient R, the vehicle speed V, and a filter coefficient τi.

A basic assistance amount setting process M66 is a process of setting a basic assistance amount Tab using the steering torque Thr and the vehicle speed V as an input. The basic assistance amount setting process M66 is a process of setting the basic assistance amount Tab to a value having a positive correlation with the steering torque Thr. This process may be, for example, a process of performing a map-based calculation of the basic assistance amount Tab by the PU 52 in a state where map data is stored in the storage device 54 beforehand. The map data is data in which the steering torque Thr and the vehicle speed V are input variables and the basic assistance amount Tab is an output variable.

The basic assistance amount setting process M66 includes a process of calculating and outputting the assistance gradient R. The assistance gradient R indicates a ratio of a change in the basic assistance amount Tab to a change in the steering torque Thr.

A phase advance compensation process M70 is a process of advancing a phase of the assistance amount Ta. For example, this may aim at performing phase compensation on the assistance amount Ta so as to adjust a response delay in a change of the steering wheel 12 relative to a change in the steering torque Th. The phase advance compensation process M70 includes a differential calculation M72, a gain setting process M74, and a multiplication process M76.

The differential calculation M72 is a process of calculating a first-order time differential value dTh of the steering torque Th. The gain setting process M74 is a process of setting a gain Gad using the assistance gradient R, the vehicle speed V, and the filter coefficient τi as an input. The gain setting process M74 may be a process of performing a map-based calculation of the gain Gad in a state where map data is stored in the storage device 54 beforehand. This map data is data in which the assistance gradient R, the vehicle speed V, and the filter coefficient τi are input variables and the gain Gad is an output variable.

The multiplication process M76 is a process of multiplying the time differential value dTh by the gain Gad. The product of the time differential value dTh and the gain Gad is an advance compensation amount Tad as an output of the phase advance compensation process M70.

A hysteresis process M80 is a process of calculating a hysteresis correction amount Thys. The hysteresis correction amount Thys is an amount for setting the assistance amount Ta to different values for when turning the steering wheel 12 back and when turning the steering wheel 12 further. The hysteresis process M80 is a process of calculating the hysteresis correction amount Thys using the steering angle θs and the vehicle speed V as an input. The hysteresis process M80 is a process of performing a map-based calculation of the hysteresis correction amount Thys using a hysteresis map M82. In the hysteresis map M82, the steering angle θs and the vehicle speed are input variables and the hysteresis correction amount Thys is an output variable.

A damping process M90 is a process of calculating a damping correction amount Tdamp that has a negative correlation with a rotation speed of the steering wheel 12. The damping correction amount Tdamp is a correction amount for applying viscous resistance to the operation of the steering wheel 12 by control. The damping process M90 includes a differential calculation M92, a basic correction amount setting process M94, and a gain setting process M96.

The differential calculation M92 is a process of calculating a first-order time differential value of the steering angle θs. The time differential value is a steering speed ωs. The basic correction amount setting process M94 is a process of calculating a basic correction amount Tdb that has a negative correlation with the steering speed ωs. The basic correction amount Tdb has a torque dimension. The basic correction amount setting process M94 may be a process of performing a map-based calculation of the basic correction amount Tdb by the PU 52 in a state where map data is stored in the storage device 54. The map data is data in which the steering speed ωs is an input variable and the basic correction amount Tdb is an output variable.

The gain setting process M96 is a process of calculating a gain Gd using the vehicle speed V as an input. The gain setting process M96 may be a process of performing a map-based calculation of the gain Gd by the PU 52 in a state where map data is stored in the storage device 54. The map data is data in which the vehicle speed V is an input variable and the gain Gd is an output variable.

The multiplication process M98 is a process of multiplying the basic correction amount Tdb by the gain Gd. The product of the basic correction amount Tdb and the gain Gd is the damping correction amount Tdamp as an output of the multiplication process M98.

A steering return process M100 is a process of calculating a return correction amount Trv. The return correction amount Trv is a correction amount for returning the steering wheel 12 to a neutral position. The return correction amount Trv has a torque dimension. The steering return process M100 includes a differential calculation M101, a target steering speed setting process M102, a deviation calculation process M103, a base compensation amount calculation process M104, a speed gain setting process M105, a torque gain setting process M106, and a multiplication process M107.

The differential calculation M101 is a process of, using the steering angle θs as an input, calculating the steering speed ωs that is the first-order time differential value thereof. The target steering speed setting process M102 is a process of setting a target steering speed ωs* using the steering angle θs and the vehicle speed V as an input. The target steering speed setting process M102 may be a process of performing a map-based calculation of the target steering speed ωs* by the PU 52 in a state where map data is stored in the storage device 54. The map data is data in which the steering angle θs and the vehicle speed V are input variables and the target steering speed ωs* is an output variable. The deviation calculation process M103 is a process of calculating a deviation Δω of the steering speed ωs from the target steering speed ωs*. The base compensation amount calculation process M104 is a process of calculating a base compensation amount Trvb using the deviation Δω as an input. The speed gain setting process M105 is a process of setting a speed gain Gv using the vehicle speed V as an input. The speed gain setting process M105 may be a process of performing a map-based calculation of the speed gain Gv by the PU 52 in a state where map data is stored in the storage device 54. The map data is data in which the vehicle speed V is an input variable and the speed gain Gv is an output variable. The torque gain setting process M106 is a process of setting the torque gain Gt using the steering torque Th as an input. The torque gain setting process M106 may be a process of performing a map-based calculation of the torque gain Gt by the PU 52 in a state where map data is stored in the storage device 54. The map data is data in which the steering torque Th is an input variable and the torque gain Gt is an output variable. The multiplication process M107 is a process of assigning, to the return correction amount Trv, a value obtained by multiplying the base compensation amount Trvb by the speed gain Gv and the torque gain Gt.

A road information process M110 is a process for superimposing, on the steering wheel 12, information relating to a road surface reaction force that is a force applied from a road surface to the turning wheels 34. The road information process M110 includes a bandpass filter M112, a gain multiplication process M114, and a filter coefficient setting process M116. The q-axis current iqt is input into the bandpass filter M112. The q-axis current iqt is input into the bandpass filter M112 as a variable including a vibrational component of the turning wheels 34 due to the road surface reaction force. The bandpass filter M112 is a process of selectively extracting a signal in a vibrational frequency band attributable to depressions and protrusions on the road surface. The gain multiplication process M114 is a process of assigning, to a road surface information torque Ti, a value obtained by multiplying an output value of the bandpass filter M112 by a gain G. The filter coefficient setting process M116 is a process of setting a filter coefficient τi of the bandpass filter M112 according to the vehicle speed V. The filter coefficient τi may be a variable or an attenuation coefficient for specifying a frequency band within which the bandpass filter M112 passes frequencies. The variable for specifying the frequency band may be, for example, a center frequency. While the filter coefficient τi is described here as one variable, there may be, in reality, a plurality of variables.

A synthesis process M120 is a process of adding the advance compensation amount Tad, the hysteresis correction amount Thys, the damping correction amount Tdamp, and the return correction amount Trv to the basic assistance amount Tab and subtracting the road surface information torque Ti from the basic assistance amount Tab. A value thus calculated is the assistance amount Ta.

Workings and Advantages of Embodiment

The PU 52 changes the filter coefficient τi in the road information process M110 according to the vehicle speed V.

Thus, road surface information that is appropriate to communicate to the driver can be communicated to the driver according to the vehicle speed V. However, depending on the frequency band of the road surface information torque Ti or on the magnitude of the amplitude of the road surface information torque Ti, the steering system tends to become unstable.

As a solution, the PU 52 changes the filter coefficients α, T1, T2 of the phase delay compensation process M60 according to the filter coefficient τi. Thus, phase delay compensation for securing the stability of the steering system that is appropriate for the currently adopted filter coefficient τi can be realized. Further, the PU 52 changes the gain Gad of the phase advance compensation process M70 according to the filter coefficient τi. Thus, phase advance compensation for securing the stability of the steering system that is appropriate for the currently adopted filter coefficient τi can be realized.

Second Embodiment

In the following, a second embodiment will be described with reference to a drawing, mainly in terms of differences from the first embodiment.

In this embodiment, the filter coefficient τi of the road information process M110 is changed according to the filter coefficients α, T1, T2 of the phase delay compensation process M60 and the gain Gad of the phase advance compensation process M70.

Figure 5:
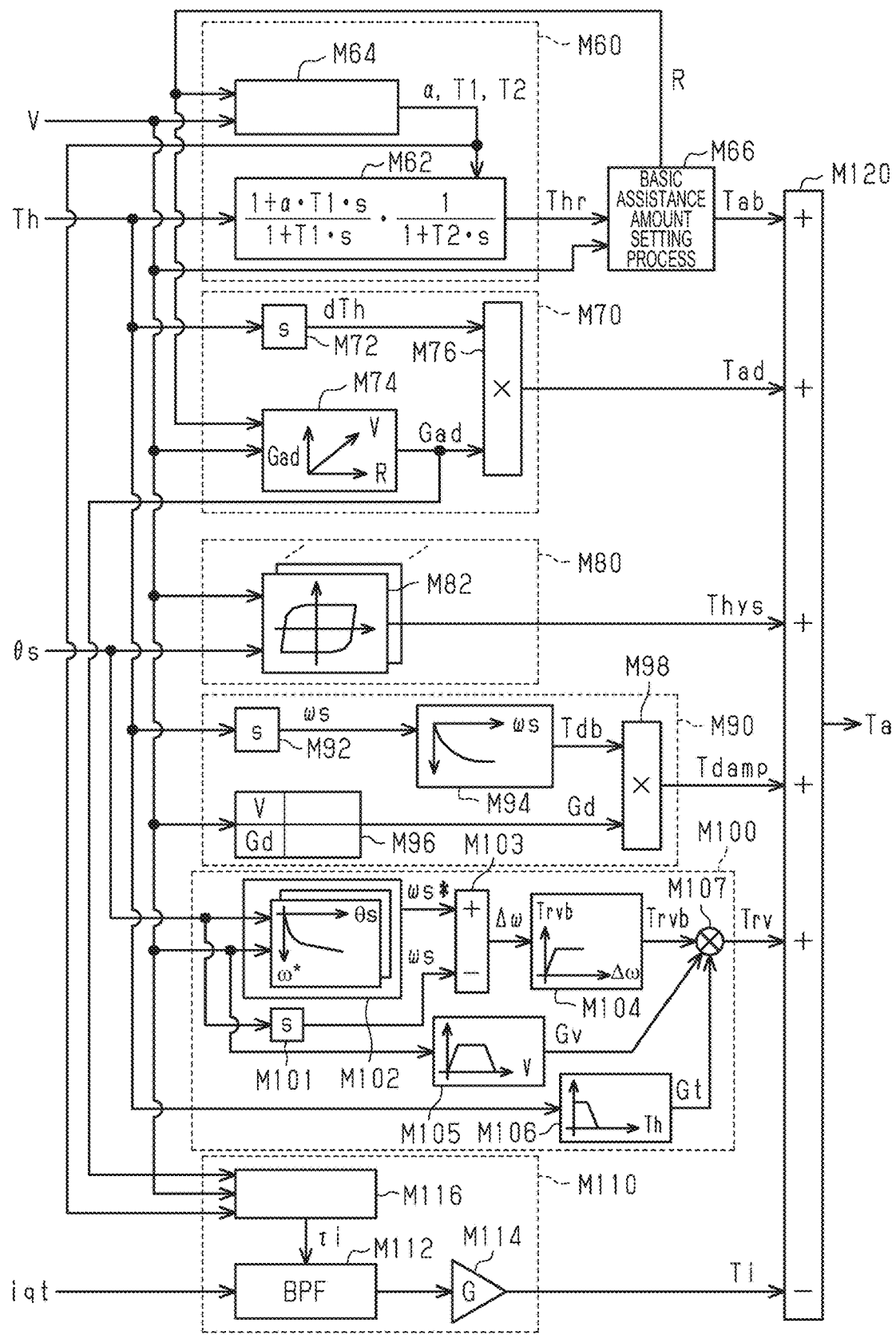
FIG. 5 is a block diagram showing processes that a control device according to a second embodiment executes.

FIG. 5 shows details of the assistance amount setting process M20 according to this embodiment. For convenience, those processes in FIG. 5 that correspond to the processes shown in FIG. 4 are denoted by the same reference signs. As shown in FIG. 5, the filter coefficient τi is not included among the input variables for the filter coefficient setting process M64 of the phase delay compensation process M60. Further, the filter coefficient τi is not included among the input variables for the gain setting process M74 of the phase advance compensation process M70. On the other hand, the filter coefficients α, T1, T2 and the gain Gad are included among the input variables for the filter coefficient setting process M116 of the road information process M110.

Therefore, the filter coefficient τi is changed according to the filter coefficients α, T1, T2 and the gain Gad. Thus, the filter coefficient τi can be set so as to obtain the road surface information torque Ti within such a range that the steering system can be kept stable by the phase delay compensation process M60 and the phase advance compensation process M70.

Third Embodiment

In the following, a third embodiment will be described with reference to a drawing, mainly in terms of differences from the first embodiment.

In this embodiment, the filter coefficients α, T1, T2 of the phase delay compensation process M60 and the gain Gad of the phase advance compensation process M70 are changed according to which hysteresis map M82 is selected in the hysteresis process M80.

Figure 6:
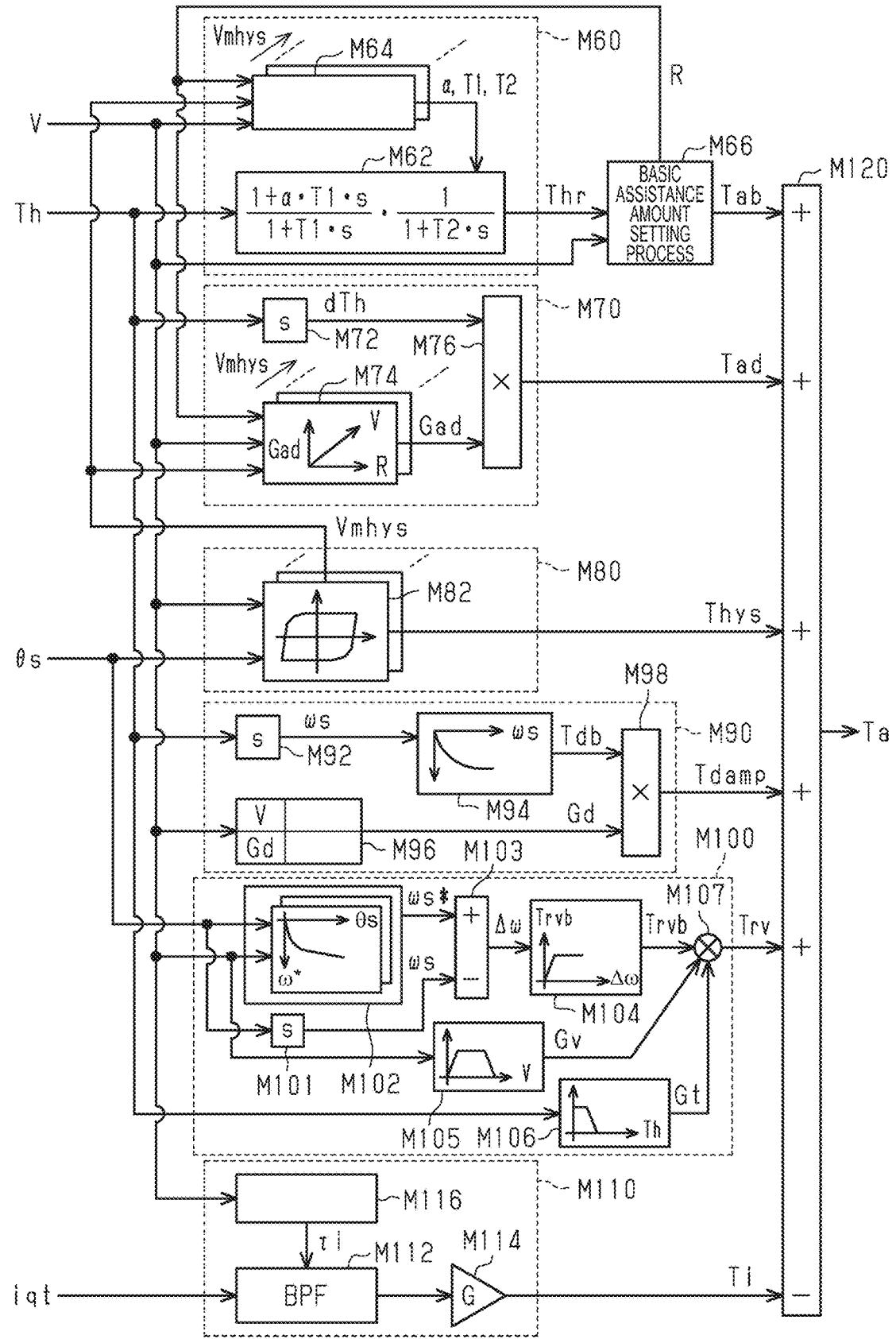
FIG. 6 is a block diagram showing processes that a control device according to a third embodiment executes.

FIG. 6 shows details of the assistance amount setting process M20 according to this embodiment. For convenience, those processes in FIG. 6 that correspond to the processes shown in FIG. 4 are denoted by the same reference signs. As shown in FIG. 6, the filter coefficient setting process M64 of the phase delay compensation process M60 is a process of setting the filter coefficients α, T1, T2 using, as an input, a map identifying variable Vmhys that identifies the hysteresis map M82 adopted by the hysteresis process M80. The gain setting process M74 of the phase advance compensation process M70 is a process of setting the gain Gad using, as an input, the map identifying variable Vmhys that identifies the hysteresis map M82 adopted by the hysteresis process M80.

The hysteresis process M80 according to this embodiment has a process of switching the hysteresis map M82 according to the vehicle speed V.

Workings and Advantages of Embodiment

When the hysteresis map M82 is changed, a ratio of a change in the assistance amount Ta to a change in the steering torque Thr changes. This ratio is not included in the assistance gradient R. Therefore, when the hysteresis map M82 is changed, the actual gain may deviate significantly from the gain that is grasped from the assistance gradient R. Thus, simply including the assistance gradient R in the inputs for the phase delay compensation process M60 and the phase advance compensation process M70 may fail to allow appropriate phase compensation for stabilizing the steering system.

As a solution, the PU 52 changes the filter coefficients α, T1, T2 according to the value of the map identifying variable Vmhys. The map identifying variable Vmhys is a variable for identifying the map that is adopted among the plurality of hysteresis maps M82. Thus, phase delay compensation for securing the stability of the steering system that is appropriate for the currently adopted hysteresis map M82 can be realized. Further, the PU 52 changes the gain Gad of the phase advance compensation process M70 according to the value of the map identifying variable Vmhys. Thus, phase advance compensation for securing the stability of the steering system that is appropriate for the currently adopted hysteresis map M82 can be realized.

Fourth Embodiment

In the following, a fourth embodiment will be described with reference to a drawing, mainly in terms of differences from the first embodiment.

Figure 7:
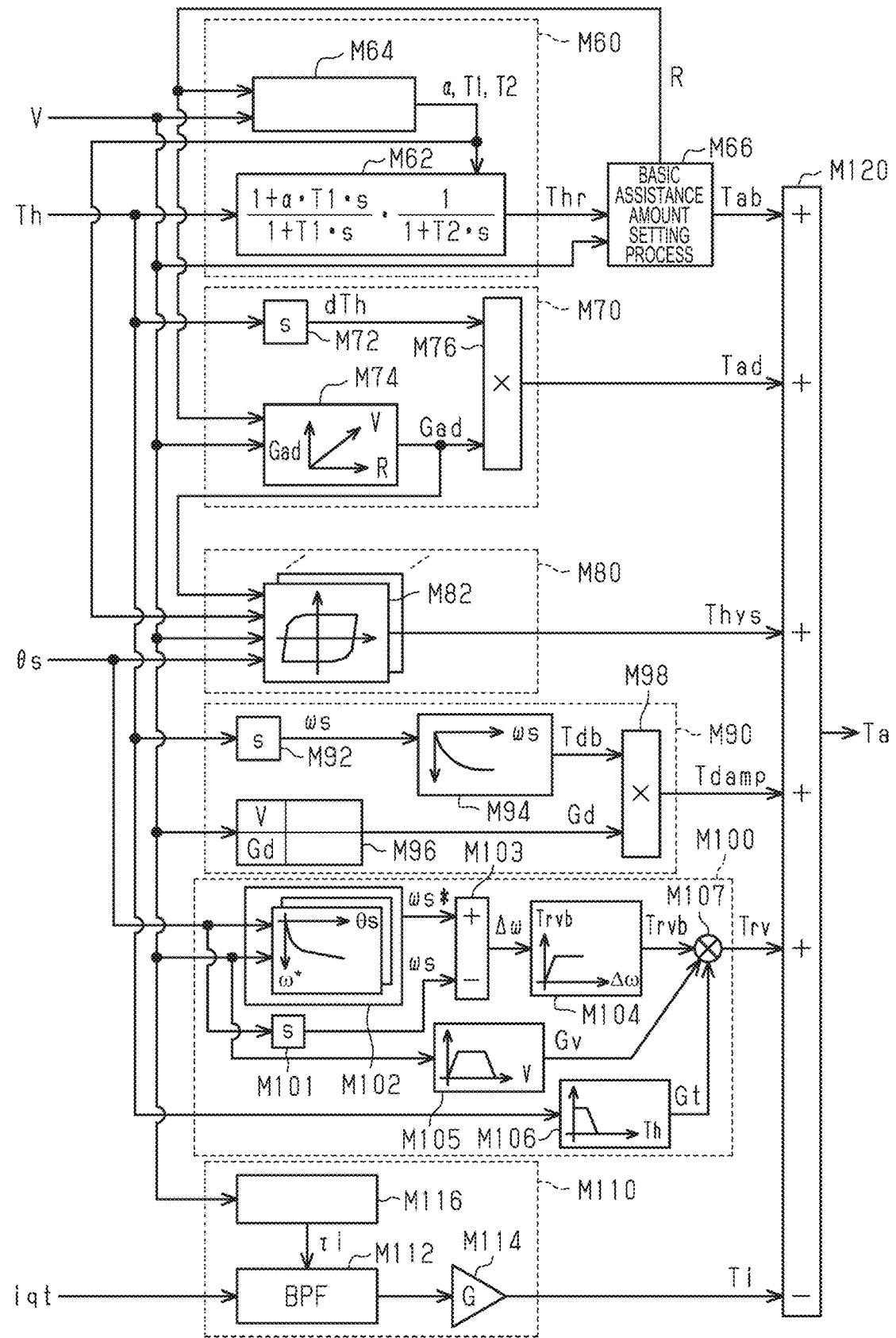
FIG. 7 is a block diagram showing processes that a control device according to a fourth embodiment executes.

In this embodiment, the hysteresis correction amount Thys is calculated according to the filter coefficients α, T1, T2 of the phase delay compensation process M60 and the gain Gad of the phase advance compensation process M70. FIG. 7 shows details of the assistance amount setting process M20 according to this embodiment. For convenience, those processes in FIG. 7 that correspond to the processes shown in FIG. 4 are denoted by the same reference signs.

As shown in FIG. 7, the hysteresis process M80 is a process of calculating the hysteresis correction amount Thys using, as an input, the filter coefficients α, T1, T2 of the phase delay compensation process M60 and the gain Gad of the phase advance compensation process M70. Specifically, the hysteresis process M80 includes a process of changing the map that is used among the plurality of hysteresis maps M82 according to the filter coefficients α, T1, T2 of the phase delay compensation process M60 and the gain Gad of the phase advance compensation process M70. This can be realized by the PU 52 calculating the value of the map identifying variable Vmhys according to the filter coefficients α, T1, T2 and the gain Gad.

Thus, the hysteresis map M82 can be set so as to obtain the hysteresis correction amount Thys within such a range that the steering system can be kept stable by the phase delay compensation process M60 and the phase advance compensation process M70.

Fifth Embodiment

In the following, a fifth embodiment will be described with reference to a drawing, mainly in terms of differences from the first embodiment.

In this embodiment, the filter coefficients α, T1, T2 of the phase delay compensation process M60 and the gain Gad of the phase advance compensation process M70 are changed according to the gain Gd of the damping process M90.

Figure 8:
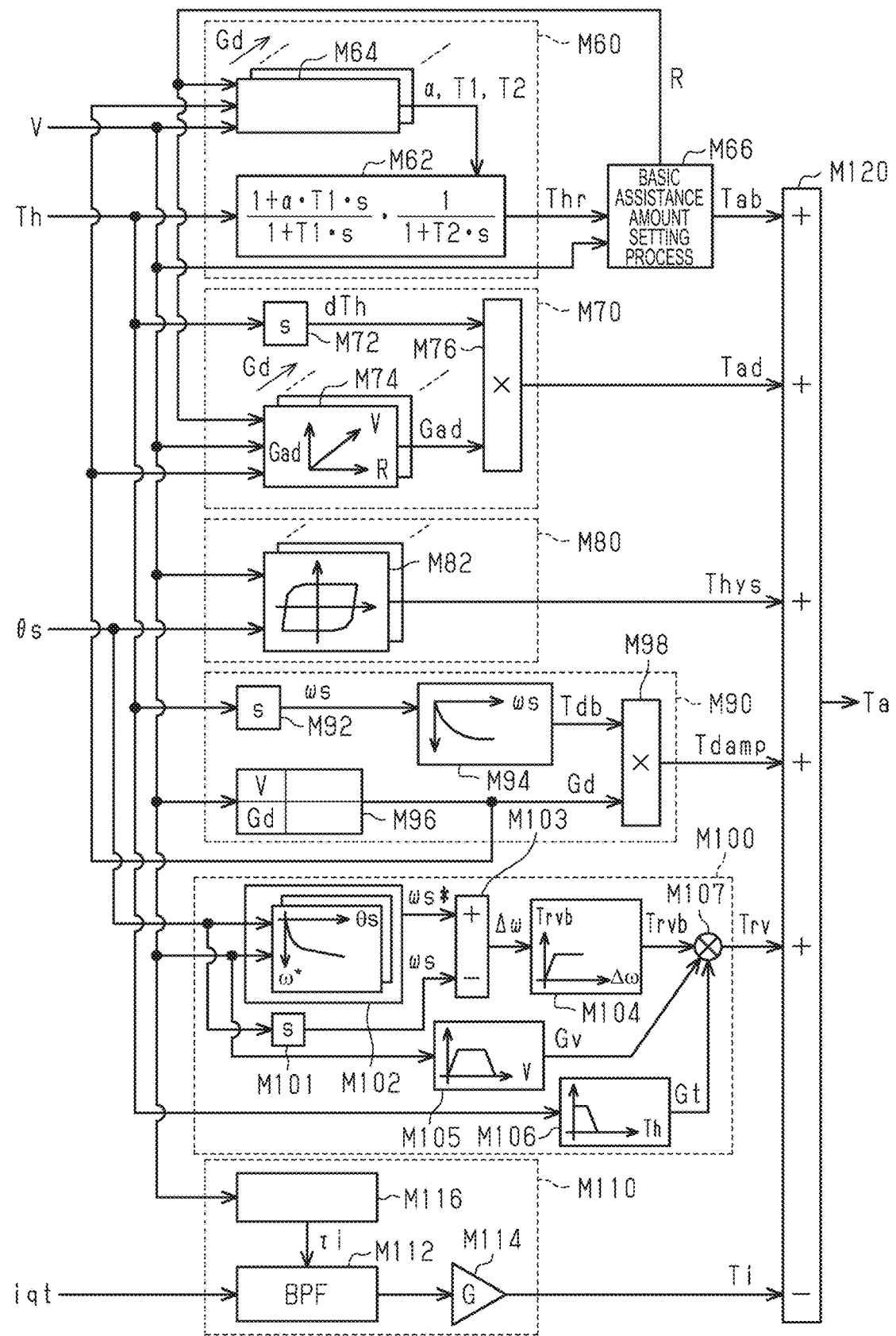
FIG. 8 is a block diagram showing processes that a control device according to a fifth embodiment executes.

FIG. 8 shows details of the assistance amount setting process M20 according to this embodiment. For convenience, those processes in FIG. 8 that correspond to the processes shown in FIG. 4 are denoted by the same reference signs. As shown in FIG. 8, the filter coefficient setting process M64 of the phase delay compensation process M60 is a process of setting the filter coefficients α, T1, T2 using the gain Gd adopted by the damping process M90 as an input. The gain setting process M74 of the phase advance compensation process M70 is a process of setting the gain Gad using the gain Gd adopted by the damping process M90 as an input.

Workings and Advantages of Embodiment

When the gain Gd of the damping process M90 is changed, the gain of the target reaction force torque Ts may deviate significantly due to, for example, a change in the ratio of the change in the assistance amount Ta to the change in the steering torque Thr. Therefore, simply including the assistance gradient R in the inputs for the phase delay compensation process M60 and the phase advance compensation process M70 may fail to allow appropriate phase compensation for stabilizing the steering system.

As a solution, the PU 52 changes the filter coefficients α, T1, T2 according to the gain Gd. Thus, phase delay compensation for securing the stability of the steering system that is appropriate for the currently adopted gain Gd can be realized. Further, the PU 52 changes the gain Gad of the phase advance compensation process M70 according to the gain Gd. Thus, phase advance compensation for securing the stability of the steering system that is appropriate for the currently adopted gain Gd can be realized.

Sixth Embodiment

In the following, a sixth embodiment will be described with reference to a drawing, mainly in terms of differences from the first embodiment.

In this embodiment, the gain Gd of the damping process M90 is calculated according to the filter coefficients α, T1, T2 of the phase delay compensation process M60 and the gain Gad of the phase advance compensation process M70.

Figure 9:
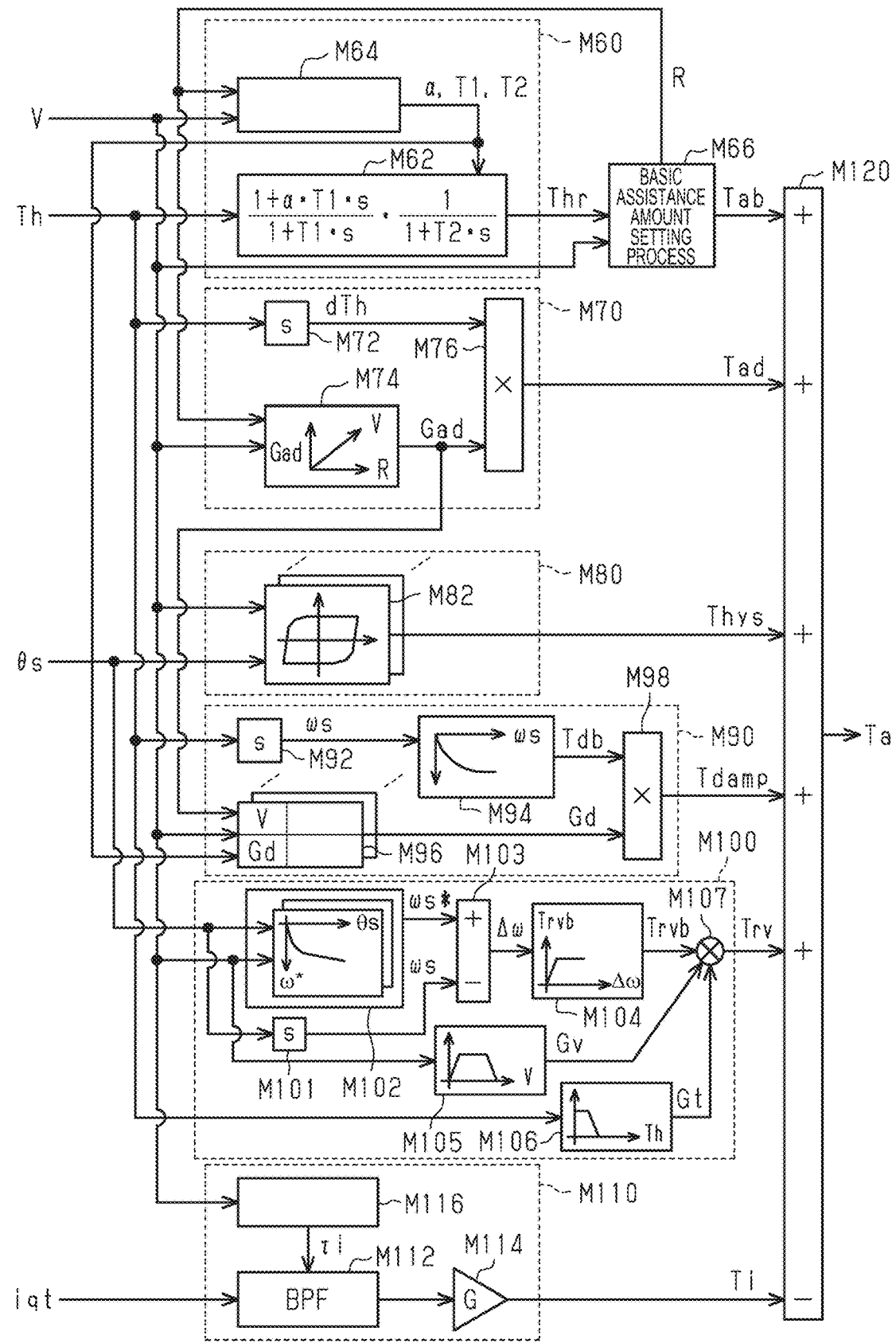
FIG. 9 is a block diagram showing processes that a control device according to a sixth embodiment executes.

FIG. 9 shows details of the assistance amount setting process M20 according to this embodiment. For convenience, those processes in FIG. 9 that correspond to the processes shown in FIG. 4 are denoted by the same reference signs. As shown in FIG. 9, the gain setting process M96 of the damping process M90 is a process of calculating the gain Gd using, as an input, the filter coefficients α, T1, T2 of the phase delay compensation process M60 and the gain Gad of the phase advance compensation process M70. Specifically, the gain setting process M96 may include a process of selecting one of a plurality of pieces of map data that specifies the relationship between the vehicle speed V and the gain Gd, according to the filter coefficients α, T1, T2 of the phase delay compensation process M60 and the gain Gad of the phase advance compensation process M70.

Thus, the gain Gd can be set so as to obtain the damping correction amount Tdamp within such a range that the steering system can be kept stable by the phase delay compensation process M60 and the phase advance compensation process M70.

Seventh Embodiment

In the following, a seventh embodiment will be described with reference to a drawing, mainly in terms of differences from the first embodiment.

In this embodiment, the filter coefficients α, T1, T2 of the phase delay compensation process M60 and the gain Gad of the phase advance compensation process M70 are changed according to a speed gain Gv and a torque gain Gt.

Figure 10:
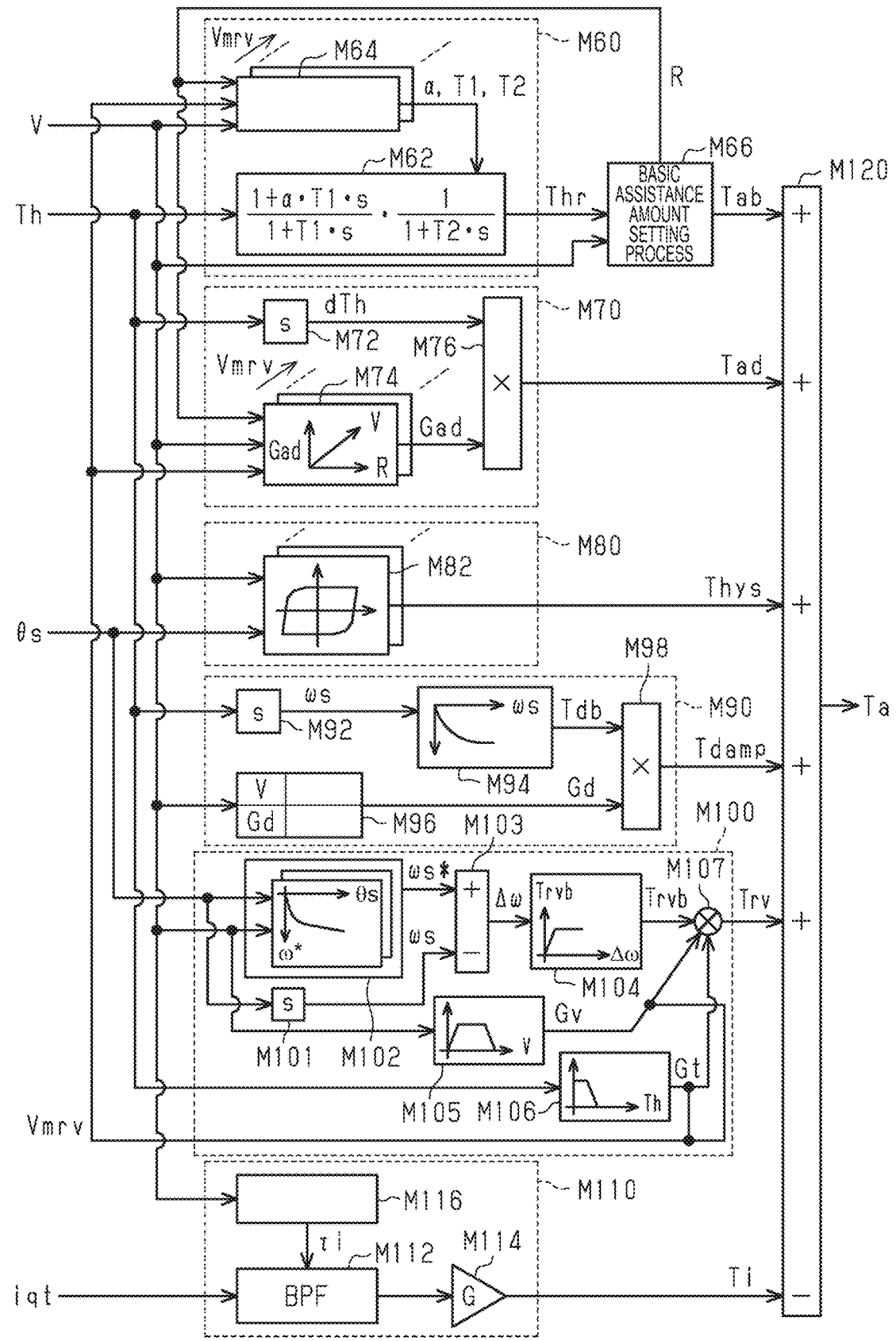
FIG. 10 is a block diagram showing processes that a control device according to a seventh embodiment executes.

FIG. 10 shows details of the assistance amount setting process M20 according to this embodiment. For convenience, those processes in FIG. 10 that correspond to the processes shown in FIG. 4 are denoted by the same reference signs.

As shown in FIG. 10, the filter coefficient setting process M64 of the phase delay compensation process M60 is a process of setting the filter coefficients α, T1, T2 using the speed gain Gv and the torque gain Gt of the steering return process M100 as an input. The gain setting process M74 of the phase advance compensation process M70 is a process of setting the gain Gad using the speed gain Gv and the torque gain Gt as an input.

Workings and Advantages of Embodiment

When the speed gain Gv and the torque gain Gt of the steering return process M100 are changed, the ratio of the change in the assistance amount Ta to the change in the steering torque Thr changes. Therefore, the gain of the target reaction force torque Ts relative to the steering torque Thr may deviate significantly. Thus, simply including the assistance gradient R in the inputs for the phase delay compensation process M60 and the phase advance compensation process M70 may fail to allow appropriate phase compensation for stabilizing the steering system.

As a solution, the PU 52 changes the filter coefficients α, T1, T2 according to the speed gain Gv and the torque gain Gt. Thus, phase delay compensation for securing the stability of the steering system that is appropriate for currently adopted return correction amount map data M106a can be realized. Further, the PU 52 changes the gain Gad of the phase advance compensation process M70 according to the speed gain Gv and the torque gain Gt. Thus, phase advance compensation for securing the stability of the steering system that is appropriate for the currently adopted speed gain Gv and torque gain Gt can be realized.

Eighth Embodiment

In the following, an eighth embodiment will be described with reference to a drawing, mainly in terms of differences from the first embodiment.

Figure 11:
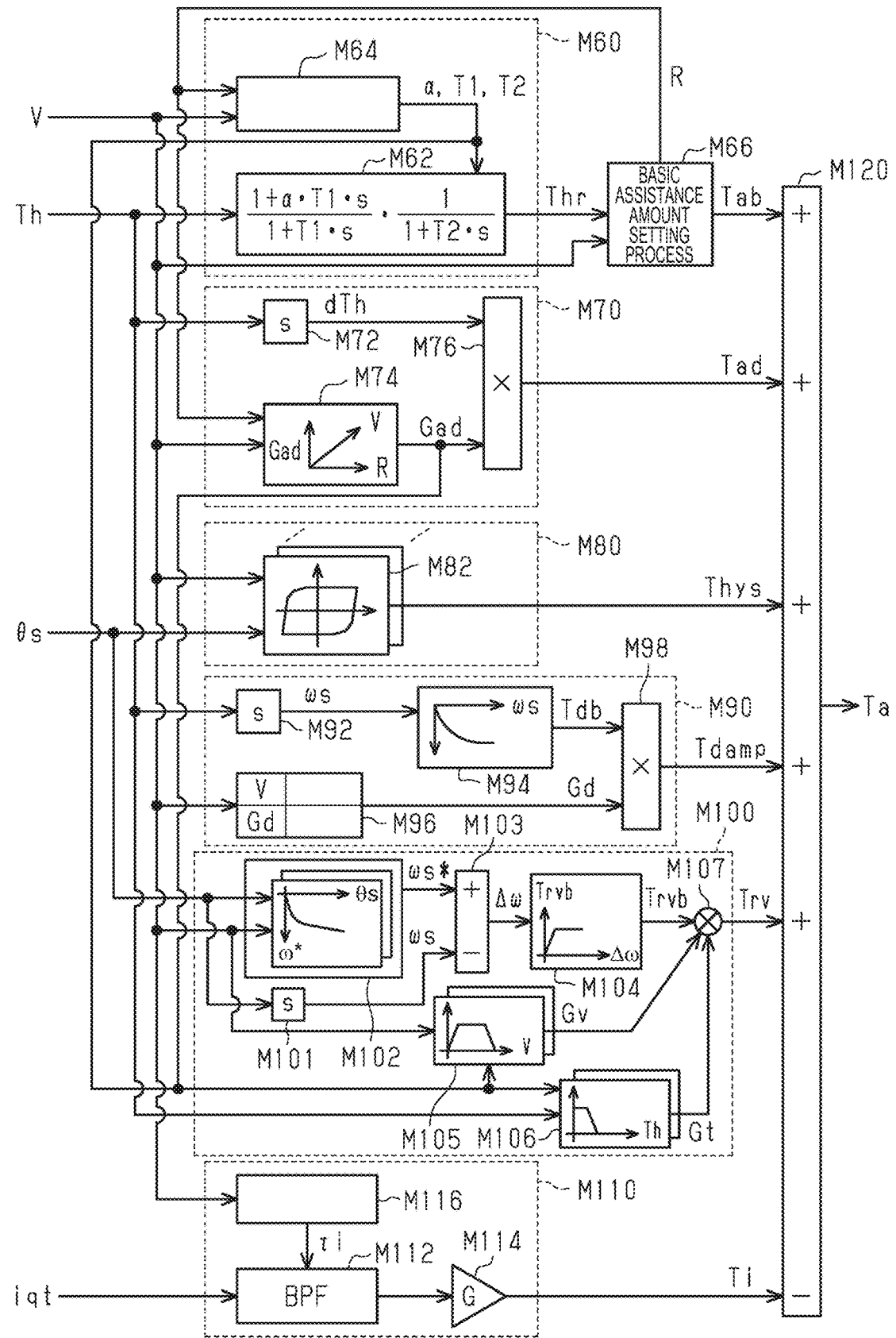
FIG. 11 is a block diagram showing processes that a control device according to an eighth embodiment executes.

In this embodiment, the return correction amount Trv is calculated according to the filter coefficients α, T1, T2 of the phase delay compensation process M60 and the gain Gad of the phase advance compensation process M70. FIG. 11 shows details of the assistance amount setting process M20 according to this embodiment. For convenience, those processes in FIG. 11 that correspond to the processes shown in FIG. 4 are denoted by the same reference signs.

As shown in FIG. 11, the speed gain setting process M105 of the steering return process M100 is a process of calculating the speed gain Gv using, as an input, the filter coefficients α, T1, T2 of the phase delay compensation process M60 and the gain Gad of the phase advance compensation process M70. Specifically, the speed gain setting process M105 is a process of calculating the speed gain Gv according to the filter coefficients α, T1, T2 of the phase delay compensation process M60 and the gain Gad of the phase advance compensation process M70 in addition to the vehicle speed V. On the other hand, the torque gain setting process M106 is a process of calculating the torque gain Gt according to the filter coefficients α, T1, T2 of the phase delay compensation process M60 and the gain Gad of the phase advance compensation process M70 in addition to the steering torque Th.

Thus, the speed gain Gv and the torque gain Gt can be set so as to obtain the return correction amount Trv within such a range that the steering system can be kept stable by the phase delay compensation process M60 and the phase advance compensation process M70.

The reaction force setting process corresponds to the assistance amount setting process M20, the axial force setting process M22, and the reaction force calculation process M24. The phase compensation process corresponds to the phase delay compensation process M60 and the phase advance compensation process M70. The reaction force adjustment process corresponds to the hysteresis process M80, the damping process M90, the steering return process M100, and the road information process M110. The reaction force application process corresponds to the reaction force operation signal generation process M26. The interlocking process corresponds to the process of changing the filter coefficients α, T1, T2 and the gain Gad according to the filter coefficient τi in FIG. 4. The interlocking process corresponds to the process of changing the filter coefficient τi according to the filter coefficients α, T1, T2 and the gain Gad in FIG. 5. The interlocking process corresponds to the process of changing the filter coefficients α, T1, T2 and the gain Gad according to the value of the map identifying variable Vmhys in FIG. 6. The interlocking process corresponds to the process of changing the map identifying variable Vmhys according to the filter coefficients α, T1, T2 and the gain Gad in FIG. 7. The interlocking process corresponds to the process of changing the filter coefficients α, T1, T2 and the gain Gad according to the gain Gd in FIG. 8. The interlocking process corresponds to the process of changing the gain Gd according to the filter coefficients α, T1, T2 and the gain Gad in FIG. 9. The interlocking process corresponds to the process of changing the filter coefficients α, T1, T2 and the gain Gad according to the speed gain Gv and the torque gain Gt in FIG. 10. The interlocking process corresponds to the process of changing the speed gain Gv and the torque gain Gt according to the filter coefficients α, T1, T2 and the gain Gad in FIG. 11. The interlocking process corresponds to the processes shown in FIG. 2. The predetermined component reflection process corresponds to the road information process M110. The reflection specifying variable corresponds to the filter coefficient τi. The predetermined component extraction process corresponds to the bandpass filter M112. The extraction changing process corresponds to the filter coefficient setting process M116. The interlocking process corresponds to the processes illustrated in FIG. 4. The predetermined component reflection process corresponds to the road information process M110. The reflection specifying variable corresponds to the filter coefficient τi. The predetermined component extraction process corresponds to the bandpass filter M112. The extraction changing process corresponds to the filter coefficient setting process M116. The interlocking process corresponds to the processes illustrated in FIG. 5. The hysteresis specifying variable corresponds to the map identifying variable Vmhys. The hysteresis correction amount calculation process corresponds to the process of calculating the hysteresis correction amount Thys using the hysteresis map M82. The hysteresis changing process corresponds to the process of changing the hysteresis map M82 according to the vehicle speed V. The interlocking process corresponds to FIG. 6. The hysteresis specifying variable corresponds to the map identifying variable Vmhys. The hysteresis correction amount calculation process corresponds to the process of calculating the hysteresis correction amount Thys using the hysteresis map M82. The hysteresis changing process corresponds to the process of changing the hysteresis map M82 according to the vehicle speed V. The interlocking process corresponds to FIG. 7. The damping specifying variable corresponds to the gain Gd. The damping correction amount calculation process corresponds to the differential calculation M92, the basic correction amount setting process M94, and the multiplication process M98. The damping changing process corresponds to the gain setting process M96. The interlocking process corresponds to FIG. 8. The damping specifying variable corresponds to the gain Gd. The damping correction amount calculation process corresponds to the differential calculation M92, the basic correction amount setting process M94, and the multiplication process M98. The damping changing process corresponds to the gain setting process M96. The interlocking process corresponds to FIG. 9. The return specifying variable corresponds to the speed gain Gv and the torque gain Gt. The return correction amount calculation process corresponds to the differential calculation M101, the target steering speed setting process M102, the deviation calculation process M103, and the base compensation amount calculation process M104. The interlocking process corresponds to the processes shown in FIG. 10. The return specifying variable corresponds to the speed gain Gv and the torque gain Gt. The return correction amount calculation process corresponds to the differential calculation M101, the target steering speed setting process M102, the deviation calculation process M103, and the base compensation amount calculation process M104. The return changing process corresponds to the speed gain setting process M105, the torque gain setting process M106, and the multiplication process M107. The interlocking process corresponds to the processes shown in FIG. 11.

Other Embodiments

The embodiments can be implemented with the following changes made thereto. The embodiments and the following modified examples can be implemented in combinations within such a range that no technical inconsistency arises.
About Phase Delay Compensation Process In FIG. 4, the filter coefficient setting process M64 uses the vehicle speed V, the assistance gradient R, and the filter coefficient τi as the input, but the input is not limited thereto. For example, the input for the filter coefficient setting process M64 may be the assistance gradient R and the filter coefficient τi. Or, for example, the input for the filter coefficient setting process M64 may be the vehicle speed V and the filter coefficient τi.

In FIG. 6, the filter coefficient setting process M64 uses the vehicle speed V, the assistance gradient R, and the map identifying variable Vmhys as the input, but the input is not limited thereto. For example, the input for the filter coefficient setting process M64 may be the assistance gradient R and the map identifying variable Vmhys. Or, for example, the input for the filter coefficient setting process M64 may be the vehicle speed V and the map identifying variable Vmhys.

In FIG. 8, the filter coefficient setting process M64 uses the vehicle speed V, the assistance gradient R, and the gain Gd as the input, but the input is not limited thereto. For example, the input for the filter coefficient setting process M64 may be the assistance gradient R and the gain Gd. Or, for example, the input for the filter coefficient setting process M64 may be the vehicle speed V and the gain Gd.

In FIG. 10, the filter coefficient setting process M64 uses the vehicle speed V, the assistance gradient R, the speed gain Gv, and the torque gain Gt as the input, but the input is not limited thereto. For example, the input for the filter coefficient setting process M64 may be the assistance gradient R, the speed gain Gv, and the torque gain Gt. Or, for example, the input for the filter coefficient setting process M64 may be the vehicle speed V, the speed gain Gv, and the torque gain Gt.

In FIGS. 5, 7, 9, and 11, the filter coefficient setting process M64 uses the vehicle speed V and the assistance gradient R as the input, but the input is not limited thereto. For example, the input for the filter coefficient setting process M64 may be restricted to either of the two of the vehicle speed V and the assistance gradient R.

The phase delay filter included in the filter process M62 is not limited to the above-described filter in which the orders of the Laplace operators of the denominator and the numerator are both 1. It is not essential that the filter process M62 includes the phase delay filter and the low-pass filter. For example, the filter process M62 may include only the phase delay filter.

In the above-described embodiment, the filter coefficients $\alpha$, T1, T2 are targets to be changed by the filter coefficient setting process M64, but the targets to be changed are not limited thereto. For example, only two of the three filter coefficients $\alpha$, T1, T2 may be the targets to be changed. Or, for example, only one of the three filter coefficients $\alpha$, T1, T2 may be the target to be changed.

About Phase advance Compensation Process

In FIG. 4, the gain setting process M74 uses the vehicle speed V, the assistance gradient R, and the filter coefficient $\tau i$ as the input, but the input is not limited thereto. For example, the input for the gain setting process M74 may be the assistance gradient R and the filter coefficient $\tau i$. Or, for example, the input for the gain setting process M74 may be the vehicle speed V and the filter coefficient $\tau i$.

In FIG. 6, the gain setting process M74 uses the vehicle speed V, the assistance gradient R, and the map identifying variable Vmhys as the input, but the input is not limited thereto. For example, the input for the gain setting process M74 may be the assistance gradient R and the map identifying variable Vmhys. Or, for example, the input for the gain setting process M74 may be the vehicle speed V and the map identifying variable Vmhys.

In FIG. 8, the gain setting process M74 uses the vehicle speed V, the assistance gradient R, and the gain Gd as the input, but the input is not limited thereto. For example, the input for the gain setting process M74 may be the assistance gradient R and the gain Gd. Or, for example, the input for the gain setting process M74 may be the vehicle speed V and the gain Gd.

In FIG. 10, the gain setting process M74 uses the vehicle speed V, the assistance gradient R, the speed gain Gv, and the torque gain Gt as the input, but the input is not limited thereto. For example, the input for the gain setting process M74 may be the assistance gradient R, the speed gain Gv, and the torque gain Gt. Or, for example, the input for the gain setting process M74 may be the vehicle speed V, the speed gain Gv, and the torque gain Gt.

In FIGS. 5, 7, 9, and 11, the gain setting process M74 uses the vehicle speed V and the assistance gradient R as the input, but the input is not limited thereto. For example, the input for the gain setting process M74 may be restricted to either of the two of the vehicle speed V and the assistance gradient R.

A low-pass filter may be provided between the differential calculation M72 and the multiplication process M76. In this case, a time constant of the low-pass filter may be changed according to the filter coefficient $\tau i$ etc. Instead of multiplying the time differential value dTh by the gain Gad in the multiplication process M76, map data may be included in which the time differential value dTh is an input and the advance compensation amount Tad is an output.

It is not essential that the phase advance compensation process includes the process of calculating the time differential value dTh. For example, instead of calculating the time differential value dTh, a process of using the steering torque Th as an input for a phase advance compensation filter may be included.

About Phase Compensation Process

It is not essential that the phase compensation process is composed of the phase delay compensation process M60 and the phase advance compensation process M70. For example, only either of the two processes of the phase delay compensation process M60 and the phase advance compensation process M70 may be included. Or, for example, a process other than the two processes of the phase delay compensation process M60 and the phase advance compensation process M70 may be further included.

About Predetermined Component Extraction Process

The predetermined component extraction process is not limited to the road information process M110. For example, the predetermined component extraction process may be a process that includes bandpass filters each corresponding to one of a plurality of frequency bands and that yields the road surface information torque Ti according to a component synthesized from frequency components extracted from the q-axis current iqt by these bandpass filters.

The variable that indicates the frequency signal applied to the turning wheels 34 and is a target for extraction of a predetermined component is not limited to the q-axis current iqt. For example, this variable may be the torque of the turning motor 42.

About Predetermined Component Changing Process

The predetermined component changing process is not limited to the process of changing the filter coefficient of the bandpass filter. For example, the predetermined component changing process may be a process of changing the gain G according to the vehicle speed V.

While the predetermined component changing process is illustrated as the process of changing the filter coefficient $\tau i$ from only the vehicle speed V in FIG. 4, the predetermined component changing process is not limited thereto.

About Predetermined Component Reflection Process

It is not essential that the predetermined component reflection process is a process of calculating the road surface information torque Ti by multiplying the output value of the bandpass filter by the gain. For example, the predetermined component reflection process may be a process that uses the output value of the bandpass filter as the road surface information torque Ti.

About Hysteresis Correction Amount Calculation Process

It is not essential that the hysteresis correction amount calculation process is a process of performing a map-based calculation. For example, the hysteresis correction amount calculation process may be a process of calculating the hysteresis correction amount Thys using a function approximator that outputs the hysteresis correction amount Thys using the steering angle θs as an input.

About Hysteresis Changing Process

While the hysteresis changing process is illustrated as the process of changing the map from only the vehicle speed V in FIG. 6, the hysteresis changing process is not limited thereto.

In the case where the hysteresis correction amount calculation process uses a function approximator as described above in the section "About Hysteresis Correction Amount Calculation Process," the hysteresis changing process may be a process of changing the function approximator to be used.

About Damping Correction Amount Calculation Process

It is not essential that the damping correction amount calculation process includes the differential calculation M92, the basic correction amount setting process M94, and the multiplication process M98. For example, the output value of the differential calculation M92 may be directly used as the input for the multiplication process M98.

About Damping Changing Process

While the example in which the damping changing process uses only the vehicle speed V as the input has been shown in FIG. 8, the damping changing process is not limited thereto.

It is not essential that the damping changing process is the gain setting process M96. For example, the basic correction amount setting process M94 may be a process of calculating the damping correction amount Tdamp by a map-based calculation, and the damping changing process may be a process of changing the map to be adopted.

About Return Correction Amount Calculation Process

It is not essential that the input for calculating the return correction amount Trv includes the three variables of the vehicle speed V, the steering angle θs, and the steering torque Th. For example, as far as these three variables are concerned, only two variables thereof may be included. Or, for example, as far as these three variables are concerned, only one variable thereof may be included.

It is not essential that the return correction amount calculation process is a process of performing a map-based calculation of the return correction amount Trv by multiplying the base compensation amount Trvb by the speed gain Gv and the torque gain Gt. For example, the return correction amount calculation process may be a process of calculating the return correction amount Trv using a function approximator that uses the steering speed ωs etc. as an independent variable and the return correction amount Trv as a dependent variable.

About Return Changing Process

In the case where the return correction amount Trv is calculated using a function approximator as described above in "About Return Correction Amount Calculation Process," the return changing process may be a process of changing the function approximator to be adopted.

About Reaction Force Adjustment Variable

The reaction force adjustment variable is not limited to the reaction force specifying variable that is a variable for specifying the reaction force adjustment process. For example, the reaction force adjustment variable may be a variable relating to the output of the reaction force adjustment process.

Figure 12:
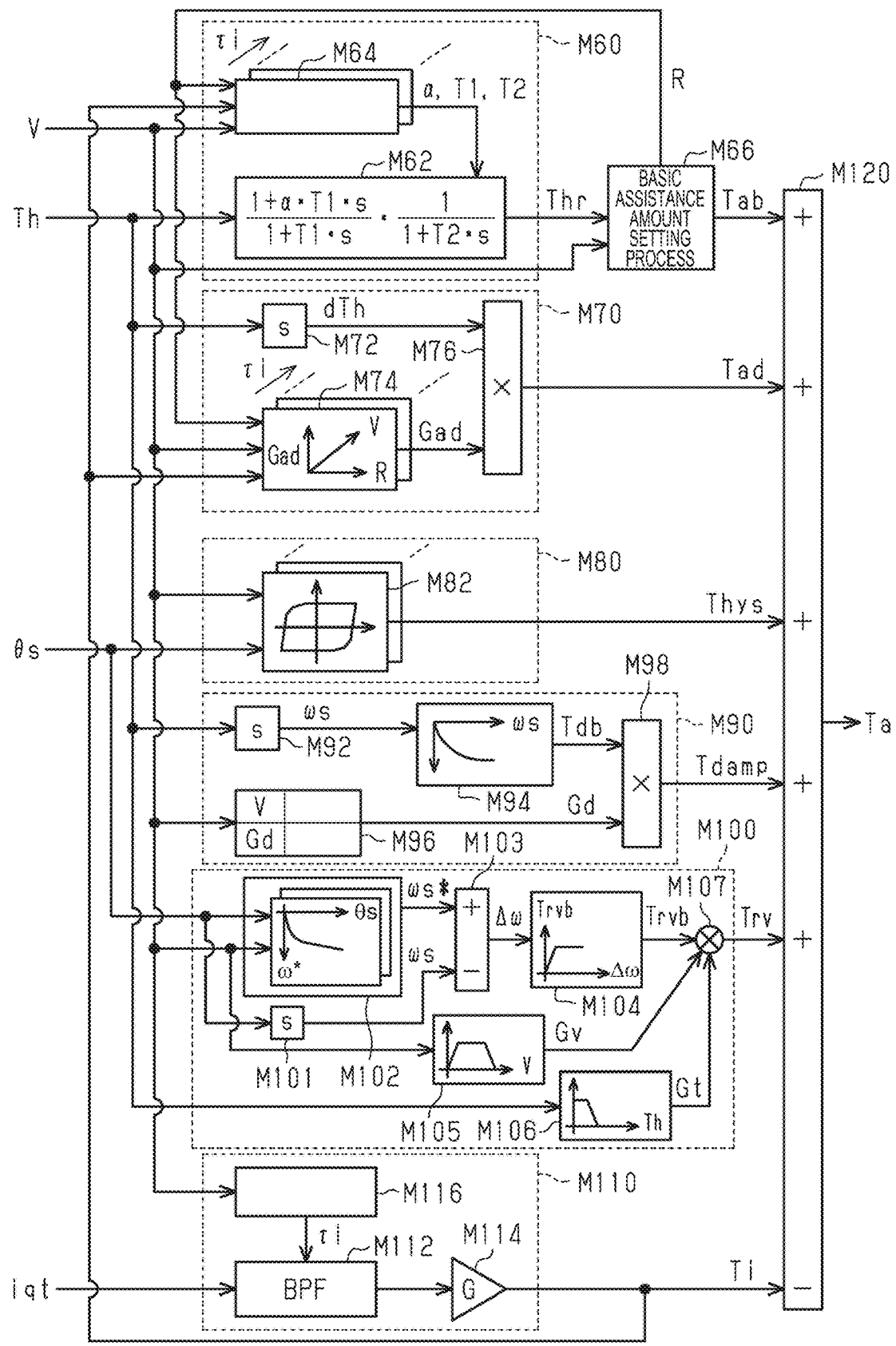
FIG. 12 is a block diagram showing processes that a control device according to a modified example of the embodiments executes.

FIG. 12 shows an example in which the PU 52 sets the filter coefficients α, T1, T2 of the phase delay compensation process M60 and the gain Gad of the phase advance compensation process M70 according to the road surface information torque Ti that is the output of the road information process M110. It is more desirable that the PU 52 set the filter coefficients α, T1, T2 of the phase delay compensation process M60 and the gain Gad of the phase advance compensation process M70 according to a time-averaged value or an amplitude of the road surface information torque Ti.

Figure 13:
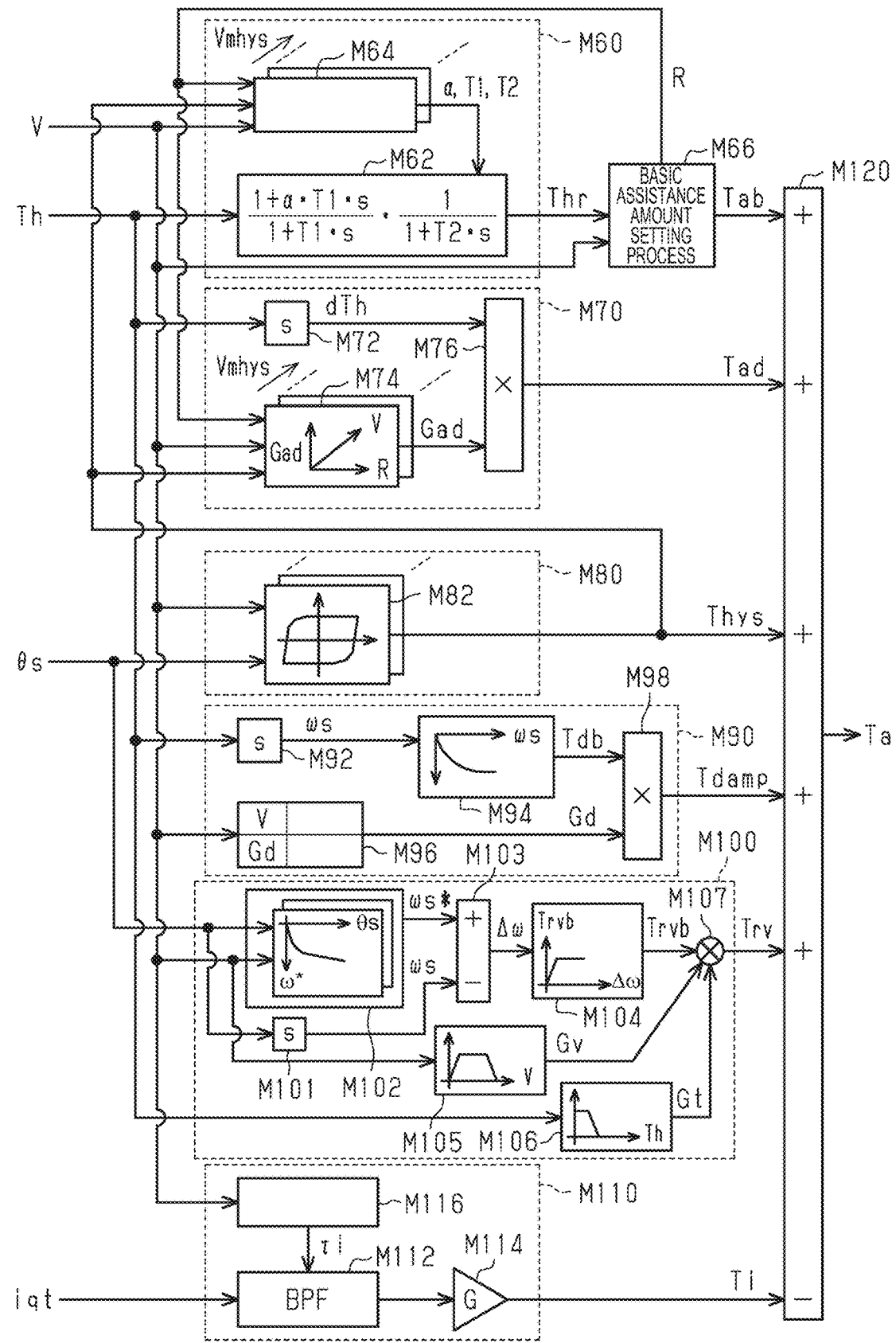
FIG. 13 is a block diagram showing processes that a control device according to a modified example of the embodiments executes.

FIG. 13 shows an example in which the PU 52 sets the filter coefficients α, T1, T2 of the phase delay compensation process M60 and the gain Gad of the phase advance compensation process M70 according to the hysteresis correction amount Thys that is the output of the hysteresis process M80. The PU 52 may set the filter coefficients α, T1, T2 of the phase delay compensation process M60 and the gain Gad of the phase advance compensation process M70 according to a time-averaged value of the hysteresis correction amount Thys.

Figure 14:
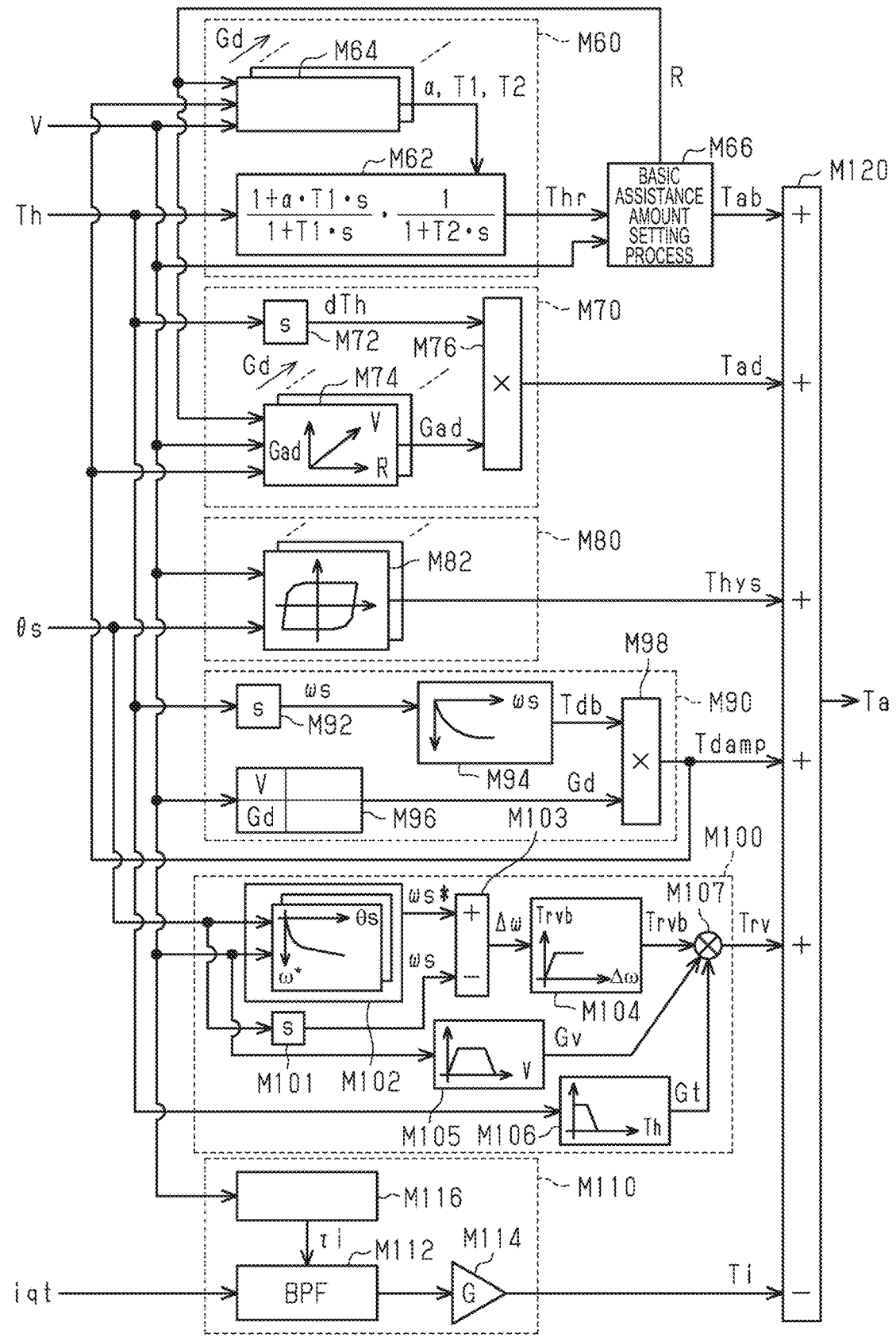
FIG. 14 is a block diagram showing processes that a control device according to a modified example of the embodiments executes.

FIG. 14 shows an example in which the PU 52 sets the filter coefficients α, T1, T2 of the phase delay compensation process M60 and the gain Gad of the phase advance compensation process M70 according to the damping correction amount Tdamp that is the output of the damping process M90. The PU 52 may set the filter coefficients α, T1, T2 of the phase delay compensation process M60 and the gain Gad of the phase advance compensation process M70 according to a time-averaged value of the damping correction amount Tdamp.

Figure 15:
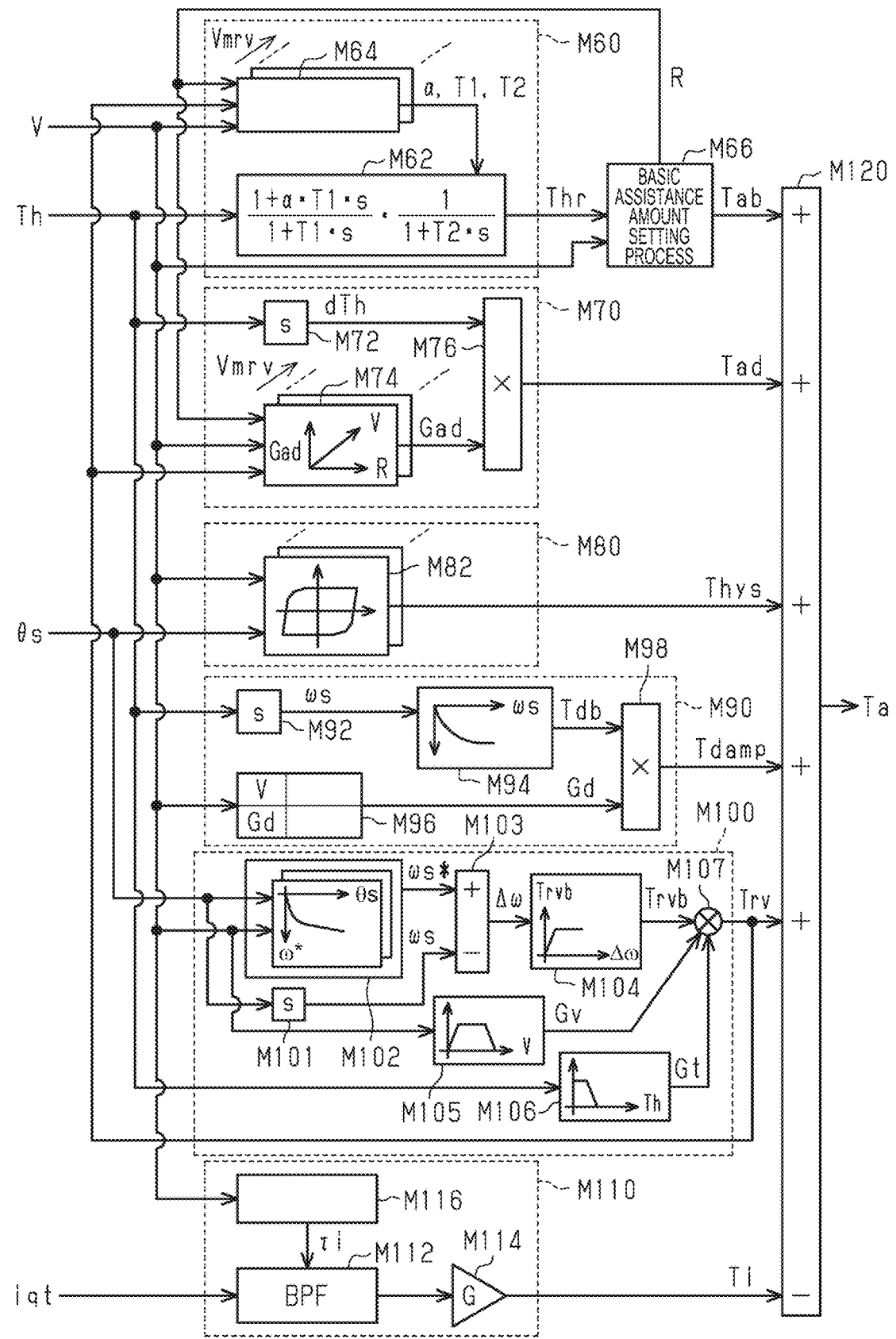
FIG. 15 is a block diagram showing processes that a control device according to a modified example of the embodiments executes.

FIG. 15 shows an example in which the PU 52 sets the filter coefficients α, T1, T2 of the phase delay compensation process M60 and the gain Gad of the phase advance compensation process M70 according to the return correction amount Trv that is the output of the steering return process M100. The PU 52 may set the filter coefficients α, T1, T2 of the phase delay compensation process M60 and the gain Gad of the phase advance compensation process M70 according to a time-averaged value of the return correction amount Trv. Or the PU 52 may set the filter coefficients α, T1, T2 of the phase delay compensation process M60 and the gain Gad of the phase advance compensation process M70 according to the base compensation amount Trvb instead of the return correction amount Trv.

About Steering Control Device

The steering control device is not limited to one that executes software processing. For example, the steering control device may include a dedicated hardware circuit, such as an ASIC, that executes at least some of the processes executed in the above-described embodiments. Thus, the steering control device should at least include a processing circuit that includes one of the following configurations (a) to (c): (a) a processing circuit including a processing device that executes all of the above-described processes in accordance with programs, and a program storage device that stores the programs, such as a storage device; (b) a processing circuit including a processing device that executes some of the above-described processes in accordance with programs, a program storage device, and a dedicated hardware circuit that executes the rest of the processes; and (c) a processing circuit including a dedicated hardware circuit that executes all of the above-described processes. Here, there may be a plurality of software execution devices including a processing device and a program storage device. Further, there may be a plurality of dedicated hardware circuits.

Others

It is not essential that the turning motor 42 is a synchronous motor. For example, the turning motor 42 may be an induction motor.

In each of the above-described embodiments, the steering device 10 has a link-less structure in which the steering wheel 12 and the turning wheels 34 are mechanically always cut off from each other. However, the steering device 10 is not limited thereto and may have a structure in which the steering wheel 12 and the turning wheels 34 can be mechanically cut off from each other by a clutch.

What is claimed is:

1. A steering control device comprising a processor that configured to control, as a target, a steering system including a reaction force motor that applies a steering reaction force to a steering shaft and a turning motor that turns a turning wheel in a state where power transmission from the steering shaft is cut off, wherein:
   the processor is configured to execute a reaction force setting process, a reaction force application process, and an interlocking process;
   the reaction force setting process is a process of setting the steering reaction force using a phase compensation process and a reaction force adjustment process;
   the reaction force application process is a process of operating the reaction force motor using, as an input, the steering reaction force set by the reaction force setting process;
   the reaction force adjustment process is a process of adjusting the steering reaction force;
   the phase compensation process is a process of performing phase compensation of the steering reaction force separately from the reaction force adjustment process;
   the interlocking process is a process of, according to one of a phase compensation specifying variable and a reaction force adjustment variable, changing the other one of the two;
   the phase compensation specifying variable is a variable for specifying a manner of the phase compensation; and
   the reaction force adjustment variable is either a variable for specifying the reaction force adjustment process or a variable relating to an output of the reaction force adjustment process.

2. The steering control device according to claim 1, wherein:
   the reaction force setting process includes an assistance amount setting process and an axial force setting process;
   the axial force setting process is a process of setting an axial force that is a force acting against a driver's operation of rotating the steering shaft;
   the assistance amount setting process is a process of setting an assistance amount using the phase compensation process and the reaction force adjustment process;
   the assistance amount is an amount of assisting the driver in rotating the steering shaft; and
   the steering reaction force is an amount that is determined according to a value obtained by subtracting the assistance amount from the axial force.

3. The steering control device according to claim 1, wherein:
   the reaction force adjustment process includes a predetermined component reflection process;
   the reaction force adjustment variable includes either a reflection specifying variable or a variable relating to an output of the predetermined component reflection process;
   the predetermined component reflection process is a process of reflecting, on the steering reaction force, a predetermined component of a frequency signal applied to the turning wheel, and includes a predetermined component extraction process and an extraction changing process;
   the predetermined component extraction process is a process of extracting the predetermined component according to a value of the reflection specifying variable;
   the reflection specifying variable is a variable that specifies a manner of extraction of the predetermined component;
   the extraction changing process is a process of changing the value of the reflection specifying variable; and
   the interlocking process includes a process of changing a value of the phase compensation specifying variable according to either the value of the reflection specifying variable or a value of the variable relating to the output of the predetermined component reflection process.

4. The steering control device according to claim 1, wherein:
   the reaction force adjustment process includes a predetermined component reflection process;
   the reaction force adjustment variable includes a reflection specifying variable;
   the predetermined component reflection process is a process of reflecting, on the steering reaction force, a predetermined component of a frequency signal applied to the turning wheel, and includes a predetermined component extraction process and an extraction changing process;
   the predetermined component extraction process is a process of extracting the predetermined component according to a value of the reflection specifying variable;
   the reflection specifying variable is a variable that specifies a manner of extraction of the predetermined component;
   the extraction changing process is a process of changing the value of the reflection specifying variable;
   the phase compensation process includes a compensation changing process;
   the compensation changing process is a process of changing a value of the phase compensation specifying variable; and
   the interlocking process includes a process of changing the value of the reflection specifying variable according to the value of the phase compensation specifying variable.

5. The steering control device according to claim 1, wherein:
   the reaction force adjustment process includes a hysteresis process;
   the reaction force adjustment variable includes either a hysteresis specifying variable or a variable relating to an output of the hysteresis process;
   the hysteresis process is a process of reflecting a hysteresis correction amount on the steering reaction force, and includes a hysteresis correction amount calculation process and a hysteresis changing process;
   the hysteresis correction amount calculation process is a process of calculating the hysteresis correction amount according to the hysteresis specifying variable so as to have different values for when steering further and when steering back;

the hysteresis changing process is a process of changing a value of the hysteresis specifying variable; and the interlocking process includes a process of changing a value of the phase compensation specifying variable according to either the value of the hysteresis specifying variable or a value of the variable relating to the output of the hysteresis process.

6. The steering control device according to claim 1, wherein:

the reaction force adjustment process includes a hysteresis process;

the reaction force adjustment variable includes a hysteresis specifying variable;

the hysteresis process is a process of reflecting a hysteresis correction amount on the steering reaction force, and includes a hysteresis correction amount calculation process and a hysteresis changing process;

the hysteresis correction amount calculation process is a process of calculating the hysteresis correction amount according to a value of the hysteresis specifying variable so as to have different values for when steering further and when steering back;

the hysteresis changing process is a process of changing the value of the hysteresis specifying variable;

the phase compensation process includes a compensation changing process;

the compensation changing process is a process of changing a value of the phase compensation specifying variable; and the interlocking process includes a process of changing the value of the hysteresis specifying variable according to the value of the phase compensation specifying variable.

7. The steering control device according to claim 1, wherein:

the reaction force adjustment process includes a damping process;

the reaction force adjustment variable includes either a damping specifying variable or a variable relating to an output of the damping process;

the damping process is a process of reflecting a damping correction amount on the steering reaction force, and includes a damping correction amount calculation process and a damping changing process;

the damping correction amount calculation process is a process of calculating the damping correction amount according to a value of the damping specifying variable;

the damping correction amount is an amount having a negative correlation with a rotation speed of the steering shaft;

the damping changing process is a process of changing the value of the damping specifying variable; and the interlocking process includes a process of changing a value of the phase compensation specifying variable according to either the value of the damping specifying variable or a value of the variable relating to the output of the damping process.

8. The steering control device according to claim 1, wherein:

the reaction force adjustment process includes a damping process;

the reaction force adjustment variable includes a damping specifying variable;

the damping process is a process of reflecting a damping correction amount on the steering reaction force, and includes a damping correction amount calculation process and a damping changing process;

the damping correction amount calculation process is a process of calculating the damping correction amount according to a value of the damping specifying variable;

the damping correction amount is an amount having a negative correlation with a rotation speed of the steering shaft;

the phase compensation process includes a compensation changing process;

the compensation changing process is a process of changing a value of the phase compensation specifying variable; and the interlocking process includes a process of changing the value of the damping specifying variable according to the value of the phase compensation specifying variable.

9. The steering control device according to claim 1, wherein:

the reaction force adjustment process includes a steering return process;

the reaction force adjustment variable includes either a return specifying variable or a variable relating to an output of the steering return process;

the steering return process is a process of reflecting a return correction amount on the steering reaction force according to a value of the return specifying variable, and includes a return correction amount calculation process and a return changing process;

the return correction amount calculation process is a process of calculating the return correction amount;

the return correction amount is a correction amount for shifting the steering shaft to a neutral position;

the return changing process is a process of changing the value of the return specifying variable; and the interlocking process includes a process of changing a value of the phase compensation specifying variable according to either the value of the return specifying variable or the variable relating to the output of the steering return process.

10. The steering control device according to claim 1, wherein:

the reaction force adjustment process includes a steering return process;

the reaction force adjustment variable includes a return specifying variable;

the steering return process is a process of reflecting a return correction amount on the steering reaction force according to a value of the return specifying variable, and includes a return correction amount calculation process and a return changing process;

the return correction amount calculation process is a process of calculating the return correction amount;

the return correction amount is a correction amount for shifting the steering shaft to a neutral position;

the phase compensation process includes a compensation changing process;

the compensation changing process is a process of changing a value of the phase compensation specifying variable; and the interlocking process includes a process of changing the value of the return specifying variable according to the value of the phase compensation specifying variable.

11. The steering control device according to claim 2, wherein:
- the assistance amount setting process includes a basic assistance amount setting process;
- the basic assistance amount setting process is a process of setting a basic assistance amount according to a detected value of a steering torque;
- the basic assistance amount is an amount serving as a basis for setting the assistance amount;
- the phase compensation process includes a phase delay compensation process;
- the phase delay compensation process is a process of delaying the detected value of the steering torque so as to be used as an input for the basic assistance amount setting process;
- the phase compensation specifying variable used as an input for the interlocking process includes a phase delay specifying variable; and
- the phase delay specifying variable is a variable that specifies a manner of the delaying.

12. The steering control device according to claim 1, wherein:
- the phase compensation process includes a phase advance compensation process;
- the phase advance compensation process is a process of reflecting, on the steering reaction force, an advance compensation amount for advancing a phase of the steering reaction force using a steering torque as an input;
- the phase compensation specifying variable that is used as an input for the interlocking process includes a phase advance specifying variable; and
- the phase advance specifying variable is a variable that specifies a manner of advancing the phase.

* * * * *